United States Patent
Wittmann et al.

(10) Patent No.: US 8,189,934 B2
(45) Date of Patent: May 29, 2012

(54) IMAGE CODING APPARATUS AND IMAGE DECODING APPARATUS

(75) Inventors: Steffen Wittmann, Morfelden-Walldorf (DE); Thomas Wedi, Gross-Umstadt (DE)

(73) Assignee: Panasonic Corporation, Osaka (JP)

( * ) Notice: Subject to any disclaimer, the term of this patent is extended or adjusted under 35 U.S.C. 154(b) by 880 days.

(21) Appl. No.: 12/294,103

(22) PCT Filed: Mar. 26, 2007

(86) PCT No.: PCT/JP2007/056180
§ 371 (c)(1),
(2), (4) Date: Sep. 23, 2008

(87) PCT Pub. No.: WO2007/111292
PCT Pub. Date: Oct. 4, 2007

(65) Prior Publication Data
US 2010/0014763 A1  Jan. 21, 2010

(30) Foreign Application Priority Data

Mar. 27, 2006 (EP) .................................... 06006302
Apr. 12, 2006 (EP) .................................... 06007740

(51) Int. Cl.
*G06K 9/36* (2006.01)
(52) U.S. Cl. .................................................... 382/232
(58) Field of Classification Search .................. 382/232, 382/233, 236, 239; 375/240.16, 240.24; 348/726
See application file for complete search history.

(56) References Cited

U.S. PATENT DOCUMENTS

| 5,500,685 | A | 3/1996 | Kokaram |
| 5,796,875 | A | 8/1998 | Read |
| 5,802,481 | A | 9/1998 | Prieto |
| 7,889,793 | B2 * | 2/2011 | Han et al. ................ 375/240.16 |
| 2003/0169931 | A1 | 9/2003 | Lainema |
| 2005/0013358 | A1 | 1/2005 | Song et al. |
| 2005/0105627 | A1 | 5/2005 | Sun et al. |
| 2008/0019597 | A1 * | 1/2008 | Song ............................ 382/233 |

FOREIGN PATENT DOCUMENTS

JP     10-150663     6/1998
(Continued)

OTHER PUBLICATIONS

International Search Report issued May 15, 2007 in the International (PCT) Application of which the present application is the U.S. National Stage.

(Continued)

*Primary Examiner* — Duy M Dang
(74) *Attorney, Agent, or Firm* — Wenderoth, Lind & Ponack, L.L.P.

(57) ABSTRACT

Provide is an image decoding apparatus which reliably prevents deterioration of the image quality of decoded images which have been previously coded. An image decoding apparatus (200) includes: an inverse quantization and inverse orthogonal transform unit (220) and an adder (230) which decode a coded image included in a coded stream (Str) to generate a decoded image (Rc); an entropy decoding unit (210) which extracts cross-correlation data (p) which indicates a cross-correlation between the decoded image (Rc) and an image which corresponds to the decoded image and has not yet been coded; and an adaptive filter (240) which computes a filter parameter (w) based on the extracted cross-correlation data (p), and performs a filtering operation on the decoded image (Rc) according to the filter parameter (w).

11 Claims, 21 Drawing Sheets

FOREIGN PATENT DOCUMENTS

JP 2005-514872 5/2005

OTHER PUBLICATIONS

English translation of a Reply Under PCT Article 34 in response to the International Search Report issued May 15, 2007 in the international application of which the present application is the U.S. national phase.

K. Pang et al., "Optimum Loop Filter in Hybrid Coders," IEEE Circuits and Systems for Video Technology, vol. 4, No. 2, Apr. 1994, pp. 158-167.

* cited by examiner

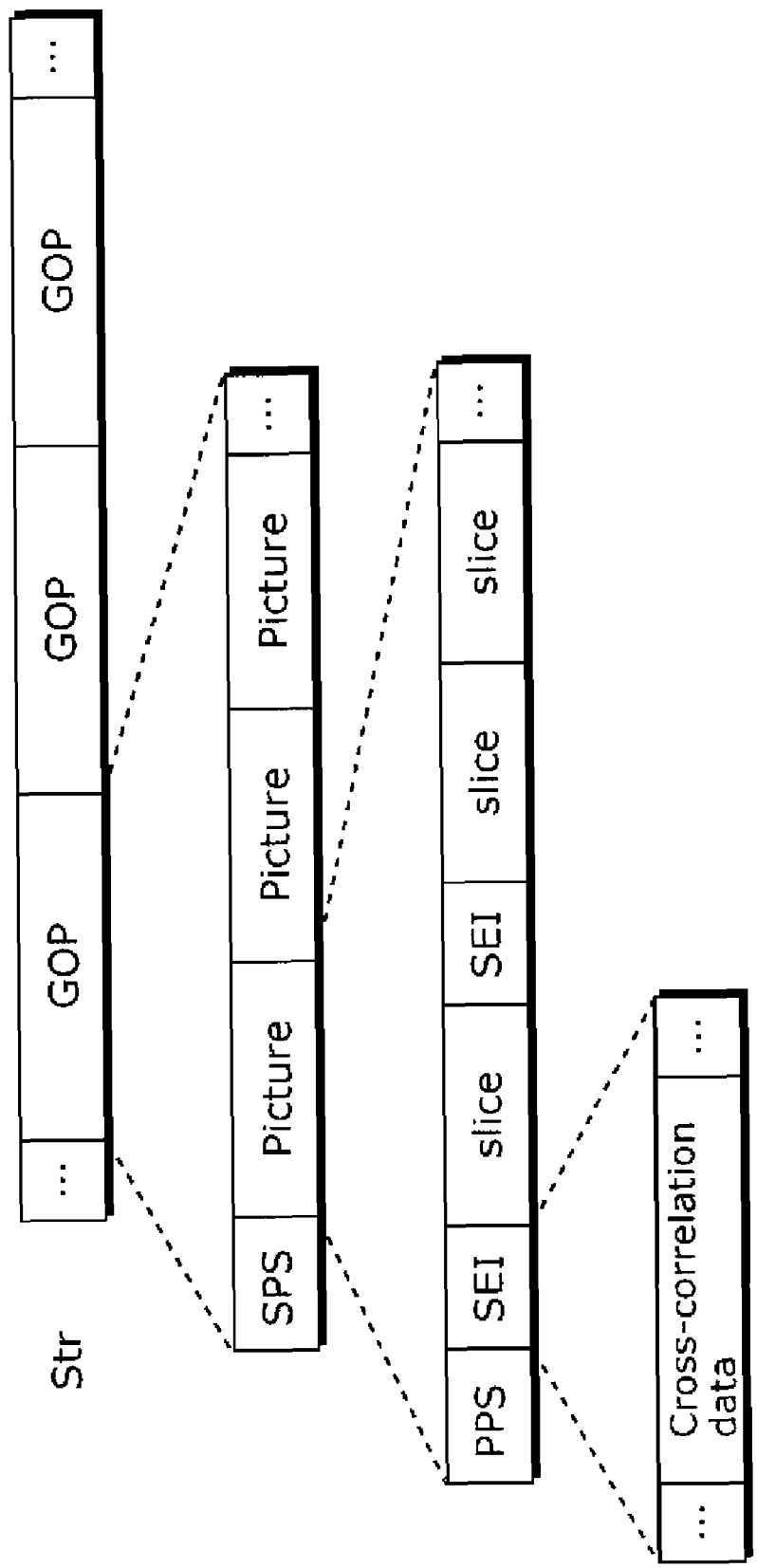

FIG. 5

| sei_payload( payloadType, payloadSize ) { | C | Descriptor |
|---|---|---|
| if( payloadType == 0 ) | | |
|    buffering_period( payloadSize ) | 5 | |
| else if( payloadType == 1 ) | | |
|    pic_timing( payloadSize ) | 5 | |
| else if( payloadType == 2 ) | | |
|    pan_scan_rect( payloadSize ) | 5 | |
| else if( payloadType == 3 ) | | |
|    filter_payload( payloadSize ) | 5 | |
| else if( payloadType == 4 ) | | |
|    user_data_registered_itu_t_t35( payloadSize ) | 5 | |
| else if( payloadType == 5 ) | | |
|    user_data_unregistered( payloadSize ) | 5 | |
| else if( payloadType == 6 ) | | |
|    recovery_point( payloadSize ) | 5 | |
| else if( payloadType == 7 ) | | |
|    dec_ref_pic_marking_repetition( payloadSize ) | 5 | |
| else if( payloadType == 8 ) | | |
|    spare_pic( payloadSize ) | 5 | |
| else if( payloadType == 9 ) | | |
|    scene_info( payloadSize ) | 5 | |
| else if( payloadType == 10 ) | | |
|    sub_seq_info( payloadSize ) | 5 | |
| else if( payloadType == 11 ) | | |
|    sub_seq_layer_characteristics( payloadSize ) | 5 | |
| else if( payloadType == 12 ) | | |
|    sub_seq_characteristics( payloadSize ) | 5 | |
| else if( payloadType == 13 ) | | |
|    full_frame_freeze( payloadSize ) | 5 | |
| else if( payloadType == 14 ) | | |
|    full_frame_frezze_release( payloadSize ) | 5 | |
| else if( payloadType == 15 ) | | |
|    full_frame_snapshot( payloadSize ) | 5 | |
| else if( payloadType == 16 ) | | |
|    progressive_refinement_segment_start( payloadSize ) | 5 | |
| else if( payloadType == 17 ) | | |
|    progressive_refinement_segment_end( payloadSize ) | 5 | |
| else If( payloadType == 18 ) | | |
|    motion_constrained_slice_group_set( payloadSize ) | 5 | |
| else if( payloadType == 19 ) | | |
|    film_grain_characteristics( payloadSize ) | 5 | |
| else if( payloadType == 20 ) | | |
|    deblocking_filter_display_preference( payloadSize ) | 5 | |
| else if( payloadType == 21 ) | | |
|    stereo_video_info( payloadSize ) | 5 | |
| else if( payloadType == 22 ) | | |
|    post_filter_hints( payloadSize ) | 5 | |
| else | | |
|    reserved_sei_message( payloadSize ) | 5 | |
| if( !byte_aligned( ) ) { | | |
|    bit_equal_to_one /* equal to 1 */ | 5 | f(1) |
|    while( !byte_aligned( ) ) | | |
|      bit_equal_to_zero /* equal to 0 */ | 5 | f(1) |
| } | | |
| } | | |

FIG. 6

| | C | Descriptor |
|---|---|---|
| post_filter_hints ( payloadSize ) { | | |
| number_of_elements | 5 | ue(v) |
| scaling_factor | 5 | ue(v) |
| for (element=0; element<number_of_elements; element++) { | | |
| filter_hint[element] | 5 | se(v) |
| } | | |
| } | | |

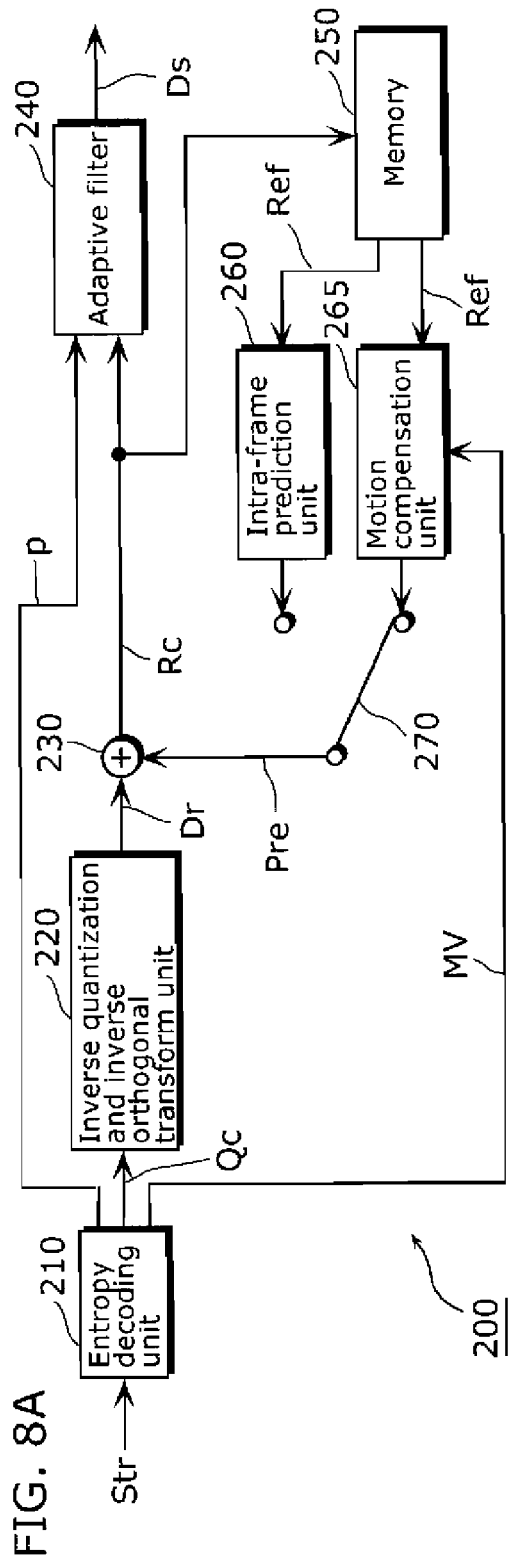
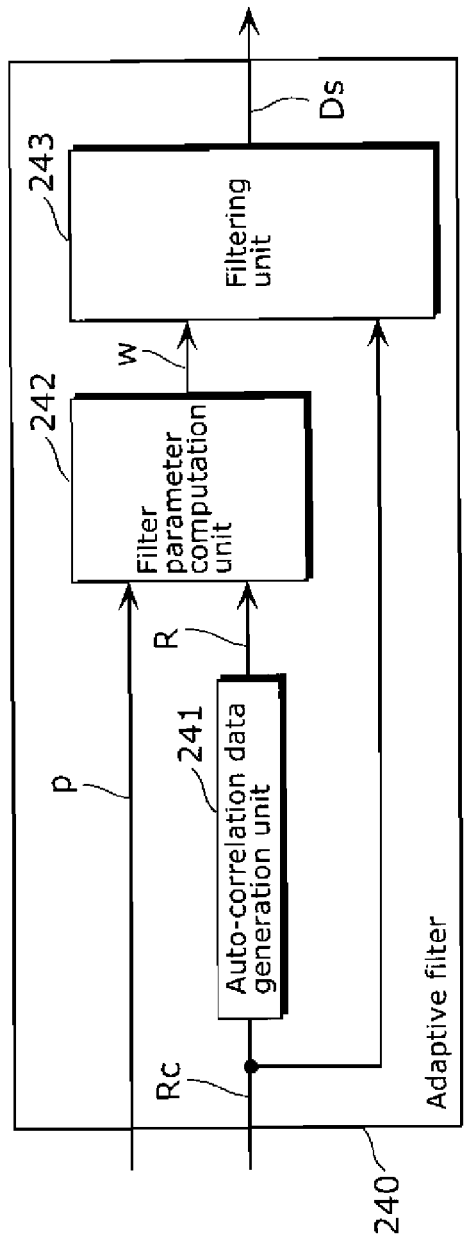
FIG. 8A
FIG. 8B

FIG. 21

| post_filter ( payloadSize ) { | C | Descriptor |
|---|---|---|
|   filter_dimension | 5 | u(1) |
|   filter_length | 5 | ue(v) |
|   scaling_factor | 5 | ue(v) |
|   for (color_component = 0; color_component < 3; color_component ++) { | | |
|     for (cy = 0; cy < filter_length; cy ++) { | | |
|       if (!filter_dimension) | | |
|         filter_coeffs[color_component][cy] | 5 | se(v) |
|       else | | |
|         for (cx = 0; cx < filter_length; cx ++) | | |
|           filter_coeffs[color_component][cy][cx] | 5 | se(v) |
|     } | | |
|   } | | |
| } | | |

IMAGE CODING APPARATUS AND IMAGE DECODING APPARATUS

TECHNICAL FIELD

The present invention relates to an image coding apparatus and an image decoding apparatus through which images are coded and decoded, and in particular to an image coding apparatus and an image decoding apparatus which filter decoded images.

BACKGROUND ART

Motion pictures are being adopted in increasing numbers of applications, ranging from video-telephoning and video-conferencing to digital television and Digital Versatile Disc (DVD). When a motion picture is being transmitted or recorded as digital data, a substantial amount of data has to be sent through transmission channels of limited available frequency bandwidth or has to be stored on storage media of limited data capacity. Thus, in order to transmit and store digital data representing a motion picture on channels and media, it is inevitable to compress and reduce the volume of the digital data.

For the compression of video data, a plurality of video coding standards has been developed. Such video standards are, for instance, ITU-T standards denoted with H.26x and ISO/IEC standards denoted with MPEG-x. The most up-to-date and advanced video coding standards are currently the standards denoted as H.264/AVC or MPEG-4/AVC.

These standards have following main stages: First, each individual frame (picture) of a motion picture is divided into blocks (macroblocks) in order to subject each video frame to data compression at a block level. Then, spatial redundancies within a frame are reduced by applying each block to a transform from the spatial domain into the frequency domain. Further, the resulting transform coefficients are quantized. As a result of such coding, the data volume of the video data is reduced. Then, the quantized transform coefficients are entropy coded.

Here, the original transform coefficient values cannot be recovered from the quantized transform coefficients due to a data in loss introduced by the above described quantizing operation. In other words, coding video data causes the image quality to be impaired by a corresponding quantizing noise.

Further, in the above described standards, in order to further minimize the data volume of the coded video data, temporal dependencies between blocks of subsequent frames are exploited to only transmit changes between subsequent frames. This is accomplished by employing a motion estimation and compensation technique.

The above described video compression technique (an image coding method) is called a hybrid coding technique, and is known to be the most effective among the various video compression techniques. The hybrid coding technique combines temporal and spatial compression techniques together with statistical coding techniques. Further, the hybrid coding technique employs motion-compensated Differential Pulse Code Modulation (DPCM), two-dimensional Discrete Cosine Transform (DCT), quantization of DCT coefficients, and a Variable Length Coding (VLC).

The motion-compensated DPCM is a process of estimating the movement of an image object between a current frame to be processed and a processed frame, and predicting the current frame to be processed according to the estimated motion to produce differences between the current frame and its prediction result.

During the coding and decoding on the image data, several disturbances are added to the image. For example, a quantization noise is added when the DCT coefficients are quantized. Further, block distortions will occur when the image is coded on a block-by-block basis.

Hereinafter, with reference to the drawings, a conventional image coding apparatus and image decoding apparatus employing the hybrid coding technique shall be described.

FIG. 1 is a block diagram showing the configuration of a conventional image coding apparatus.

An image coding apparatus 1000 includes a subtractor 1100, an orthogonal transform and quantization unit 1200, an inverse quantization and inverse orthogonal transform unit 1300, an adder 1350, a de-blocking filter 1400, a memory 1500, an intra-frame prediction unit 1600, a motion compensation unit 1650, a motion estimation unit 1700, a switching unit 1800, and an entropy coding unit 1900.

The subtractor 1100 calculates, as a prediction error Res, differences between an input image represented by an input image signal In and a predictive image Pre outputted from either the intra-frame prediction unit 1600 or the motion compensation unit 1650.

The orthogonal transform and quantization unit 1200 transforms the prediction error Res calculated by the subtractor 1100 to frequency components (by Discrete Cosine Transform, for example), and quantizes each of the frequency components to compress-code them into quantized coefficients Qc.

The inverse quantization and inverse orthogonal transform unit 1300 de-quantizes the quantized coefficients Qc outputted from the orthogonal transform and quantization unit 1200 so as to transform the quantized coefficients Qc to frequency components. Furthermore, by applying an inverse orthogonal transformation to the frequency components (Inverse Discrete Cosine Transform, for example), the inverse quantization and inverse orthogonal transform unit 1300 transforms the frequency components to a prediction error Dr.

The adder 1350 adds the above mentioned predictive image Pre and prediction error Dr to generate a locally decoded image Rc, and outputs the locally decoded image Rc to the de-blocking filter 1400.

The de-blocking filter 1400 filters the locally decoded image Rc outputted from the adder 1350 to remove block distortions therefrom. That is to say, the above described processing, up to the generation of the locally decoded image Rc, is performed per block of a picture, and thus the locally decoded image Rc contains block distortions. Therefore, the de-blocking filter 1400 removes the block distortions from the locally decoded image Rc.

For example, the de-blocking filter 1400 smoothes the edge of each block by a linear filtering of the borders of each block of the locally decoded image Rc. Then, the de-blocking filter 1400 stores the filtered locally decoded image Rc in the memory 1500 as a locally decoded image Rdf.

When macroblocks in the input image are to be coded in the intra mode, the intra-frame prediction unit 1600 extracts one or more locally decoded images Rdf corresponding to the input image to be coded from the memory 1500 as reference image(s) Ref, and generates, using the extracted reference image(s) Ref, a predictive image Pre corresponding to the input image to be coded.

The motion estimation unit 1700 refers to, as a reference image Ref, a picture coded prior to the to-be-coded picture in the input image, that is, refers to the locally decoded image Rc stored in the memory 1500, to estimate a motion vector MV per macroblock of the to-be-coded picture, for example.

When macroblocks in the input image are to be coded in the inter mode, the motion compensation unit 1650 extracts, from the reference image Ref stored in the memory 1500, an image of an area indicated by the motion vector MV estimated by the motion estimation unit 1700, to output the image as a predictive image Pre.

When the macroblocks are to be coded in the intra mode, the switching unit 1800 connects the subtractor 1100 to the intra-frame prediction unit 1600 so that the subtractor 1100 uses, for its processing, the predictive image Pre outputted from the intra-frame prediction unit 1600. Alternatively, when the macroblocks are to be coded in the inter mode, the switching unit 1800 connects the subtractor 1100 to the motion compensation unit 1650 so that the subtractor 1100 uses, for its processing, the predictive image Pre outputted from the motion compensation unit 1650.

The entropy coding unit 1900 generates a coded stream Str by performing entropy coding (variable-length coding) on the quantized coefficients Qc generated by the orthogonal transform and quantization unit 1200 and the motion vector MV estimated by the motion estimation unit 1700.

Such an image coding apparatus 1000 as described above codes an input image through generation of a predictive image Pre; orthogonal transformation; quantization; subtraction of the predictive image Pre from an input image; and so on. The image coding apparatus 1000 further decodes the coded input image through inverse quantization of quantized coefficients Qc; inverse orthogonal transformation, addition of a prediction error Dr and the predictive image Pre; and so on.

FIG. 2 is a block diagram showing the configuration of a conventional image decoding apparatus.

An image decoding apparatus 2000 includes an entropy decoding unit 2100, an inverse quantization and inverse orthogonal transform unit 2200, an adder 2300, a de-blocking filter 2400, a memory 2500, an intra-frame prediction unit 2600, a motion compensation unit 2650, and a switching unit 2700.

The entropy decoding unit 2100 obtains a coded stream Str and performs entropy decoding (variable-length decoding) thereon. Then, the entropy decoding unit 2100 extracts quantized coefficients Qc and a motion vector MV from the entropy decoded coded stream Str.

The inverse quantization and inverse orthogonal transform unit 2200 obtains the quantized coefficients Qc extracted by the entropy decoding unit 2100, and de-quantizes the quantized coefficients Qc to transform them to frequency components. Furthermore, by applying an inverse orthogonal transformation to the frequency component (Discrete Cosine Transform, for example), the inverse quantization and inverse orthogonal transform unit 2200 transforms the frequency component to a prediction error Dr.

The adder 2300 adds, to the prediction error Dr outputted from the inverse quantization and inverse orthogonal transform unit 2200, the predictive image Pre outputted from the intra-frame prediction unit 2600 or from the motion compensation unit 2650, to generate a decoded image Rc. Further, the adder 2300 outputs the generated decoded image Rc to the de-blocking filter 2400.

The de-blocking filter 2400 filters the decoded image Rc outputted from the adder 2300 to remove block distortions therefrom. That is to say, the above described processing, up to the generation of the decoded image Rc, is performed per block of a picture, and thus the decoded image Rc includes block distortions.

For example, the de-blocking filter 2400 smoothes the edge of each block by a linear filtering of the borders of each block of the decoded image Rc. Then, the de-blocking filter 2400 outputs the filtered decoded image Rc as an output image Ds, and stores the decoded image Rc in the memory 2500 as a reference image Ref.

When macroblocks included in the coded stream Str are to be decoded in the intra mode, the intra-frame prediction unit 2600 extracts one or more reference images Ref corresponding to the prediction error Dr from the memory 2500, and generates a predictive image Pre using the extracted reference image(s) Ref.

When macroblocks included in the coded stream Str are to be decoded in the inter mode, the motion compensation unit 2650 extracts, from a reference image Ref stored in the memory 2500, an image of an area indicated by the motion vector MV extracted by the entropy decoding unit 2100, to output the extracted image as a predictive image Pre.

When macroblocks to be decoded have been coded in the intra mode, the switching unit 2700 connects the adder 2300 to the intra-frame prediction unit 2600 so that the adder 2300 uses, for its processing, the predictive image Pre outputted from the intra-frame prediction unit 2600. Alternatively, when the macroblocks are to be decoded in the inter mode, the switching unit 2700 connects the adder 2300 to the motion compensation unit 2650 so that the adder 2300 uses, for its processing, the predictive image Pre outputted from the motion compensation unit 2650.

Such an image decoding apparatus 2000 as described above performs decoding through inverse quantization of quantized coefficients Qc; inverse orthogonal transformation; addition of a prediction error Dr and a predictive image Pre; and so on.

As described above, with the conventional image coding apparatus 1000 and image decoding apparatus 2000, coding and decoding of images causes the locally decoded images Rc in the image coding apparatus 1000 and the decoded images Rc in the image decoding apparatus 2000 to be inferior in image quality to input images corresponding to such images. In other words, the locally decoded images Rc and the decoded images Rc are distorted compared to the input images, and contain noise as a result of the coding and decoding. Noise includes quantization noise, block distortions, and so on.

Thus, the de-blocking filters 1400 and 2400 are provided to improve the image quality of the locally decoded images Rc and the decoded images Rc.

However, such de-blocking filters 1400 and 2400 cannot adequately improve the image quality of the locally decoded images Rc and the decoded images Rc. To be more specific, the de-blocking filters 1400 and 2400 only attempt to remove block distortions by smoothing the borders of blocks, and do not remove other types of noise or improve the image quality of areas other than the borders. In addition, the de-blocking filters 1400 and 2400 are not capable of applying a suitable filtering to the locally decoded images Rc and the decoded images Rc because regardless of the content (sharpness, smoothness, for example) of the locally decoded images Rc and the decoded images Rc, a linear filtering is applied with predetermined filter coefficients.

In light of the above, in order to improve the image quality, proposed is a filtering adapted to each image, that is, an adaptive filtering applied by analyzing the content of the image. For example, an image which has been coded and then decoded is analyzed, and a filter parameter (filter coefficients), which is adapted depending on the analysis result, is used for the filtering.

Patent Reference 1 describes an adaptive filtering of a video sequence. With the adaptive filtering according to Patent Reference 1, motion and noise of a decoded image is estimated to compute a filter parameter adaptive to the estimation result, and the decoded image is applied to a filtering according to the computed filter parameter. Based on the above mentioned estimation, an iterative calculation of filter parameters is carried out.

Patent Reference 1: United States Patent Application Publication No. 2005/0105627

DISCLOSURE OF INVENTION

Problems that Invention is to Solve

However, even the adaptive filtering of Patent Reference 1 cannot bring the image quality of decoded images near that of corresponding input images.

More specifically, with the adaptive filtering of Patent Reference 1, filter parameters are determined based on decoded images containing distortions and noise, and thus improvement of the image quality is limited. A further enhancement of the image quality of decoded images can be achieved by increasing the bit rate of coded streams Str which include coded input images. However, in such a case, storage of the coded streams Str requires a high-capacity recording medium, and transmission of the coded streams Str requires a transmission medium with a wide bandwidth.

Thus, the present invention has been conceived in view of the above described problems, and an object thereof is to provide an image coding apparatus and an image decoding apparatus which reliably prevent deterioration of the image quality of decoded images which have been previously coded.

Means to Solve the Problems

In order to achieve the object set forth above, the image decoding apparatus according to the present invention is an image decoding apparatus which decodes a coded image, the image decoding apparatus comprising: a decoding unit configured to decode the coded image included in a coded stream to generate a decoded image; an extraction unit configured to extract cross-correlation data from the coded stream, the cross-correlation data indicating a correlation between the decoded image and an image which corresponds to the decoded image and has not yet been coded; a parameter computation unit configured to compute a filter parameter based on the cross-correlation data extracted by the extraction unit; and a filtering unit configured to perform a filtering operation on the decoded image according to the filter parameter. For example, the parameter computation unit is configured to compute the filter parameter by generating auto-correlation data indicating a correlation of the decoded image, and performing an operation using the auto-correlation data and the cross-correlation data. Further, the parameter computation unit is configured to compute the filter parameter as a filter coefficient used for a Wiener filter.

Thus, the image decoding apparatus, for example, obtains cross-correlation data indicating a cross-correlation between a decoded image which is distorted with noise and an image which is the original image of the decoded image and having no distortions as not being coded; and applies a Wiener filter to the decoded image, thereby making it possible to bring the decoded image close to the undistorted original image. As a result, it is possible to reliably prevent deterioration of the image quality of decoded images which have been previously coded.

Furthermore, it may be that the extraction unit is configured to extract the cross-correlation data from a header of an area which includes a coded block, a coded slice, a coded picture, or a set of so plural coded pictures, the header being included in the coded stream. Moreover, it may be that the extraction unit is configured to extract the cross-correlation data from supplementary enhancement information of a coded picture included in the coded stream.

Thus, since the cross-correlation data is in the supplementary enhancement information, the image decoding apparatus can apply a Wiener filter to the decoded image using the cross-correlation data, and can also choose not to apply a Wiener filter by skipping the cross-correlation data.

Further, it may be that the parameter computation unit is configured to generate the auto-correlation data for each of areas of the decoded image, and to compute the filter parameter for each of the areas. For example, the parameter computation unit is configured to treat, as each of the areas, a block, a slice, a picture, or a set of plural pictures, and to compute the auto-correlation data and the filter parameter for each of the areas.

Thus, it is possible to compute, for each area such as a block or a slice, a filter parameter that is suitable for the area. That is, even when the same cross-correlation data is used by all the blocks in a slice, for example, it is still possible to compute, for each of the blocks, a filter parameter that is suitable for the block, which enables reliable prevention of image quality deterioration.

In order to achieve the object set forth above, the image coding apparatus according to the present invention is an image coding apparatus which codes an input image, the image coding apparatus comprising: a coding unit configured to code the input image to generate a coded image; a decoding unit configured to decode the coded image to generate a decoded image; a cross-correlation data generation unit configured to generate cross-correlation data indicating a correlation between the input image and the decoded image; and an insertion unit configured to insert the cross-correlation data into a coded stream which includes the coded image generated by the coding unit. For example, the image coding apparatus further comprises: a parameter computation unit configured to compute a filter parameter by generating auto-correlation data indicating a correlation of the decoded image, and performing an operation using the auto-correlation data and the cross-correlation data; and a filtering unit configured to perform a filtering operation on the decoded image according to the filter parameter. Further, the parameter computation unit is configured to compute the filter parameter as a filter coefficient used for a Wiener filter.

Thus the image decoding apparatus obtaining the coded stream can, for example, obtain cross-correlation data indicating a cross-correlation between a decoded image which is distorted with noise and an image which is the original image of the decoded image and having no distortions as not being coded; and bring the decoded image close to the undistorted original image by applying a Wiener filter to the decoded image. As a result, it is possible to reliably prevent deterioration of the image quality of decoded images which have been previously coded.

Further, it may be that the insertion unit is configured to insert the cross-correlation data into a header of an area which includes a coded block, a coded slice, a coded picture, or a set of plural coded pictures, the header being included in the coded stream. Moreover, it may be that the insertion unit is configured to insert the cross-correlation data into supplementary enhancement information of a coded picture included in the coded stream.

Thus, since the cross-correlation data is in the supplementary enhancement information, the image decoding apparatus obtaining the coded stream can apply a Wiener filter to the decoded image using the cross-correlation data, and can also choose not to apply a Wiener filter by skipping the cross-correlation data.

Further, it may be that the cross-correlation data generation unit is configured to generate the cross-correlation data for each of areas of an image. For example, the cross-correlation data generation unit is configured to treat, as each of the areas, a block, a slice, a picture, or a set of plural pictures, and to generate the cross-correlation data for each of the areas.

Thus, the image decoding apparatus obtaining the coded stream can compute, for each area such as a block or a slice, a filter parameter that is suitable for the area, making it possible to reliably prevent deterioration of the image quality. In addition, as described above that the cross-correlation data is generated for each of small areas such as a block, the prevention of the image quality deterioration is more effective with smaller areas. Further, as described above that the cross-correlation data is generated for each of large areas such as plural pictures, the volume reduction of cross-correlation data included in a coded stream and the volume suppression of the coded stream are more effective with larger areas.

It is to be noted that the present invention can be embodied not only as an image coding apparatus and an image decoding apparatus described above, but also as methods and programs thereof, storage media in which the programs are stored, and integrated circuits.

Effects of the Invention

The image coding apparatus and the image decoding apparatus according to the present invention produce an advantageous effect of reliably preventing deterioration of the image quality of decoded images which have been previously coded.

BRIEF DESCRIPTION OF DRAWINGS

FIG. 4 is a diagram showing the structure of a coded stream according to the embodiment of the present invention.

FIG. 5 is a diagram showing an example of syntax for SEI according to the embodiment of the present invention.

FIG. 6 is a diagram showing an example of syntax for cross-correlation data according to the embodiment of the present invention.

FIG. 8A is a block diagram showing the configuration of an image decoding apparatus according to the embodiment of the present invention.

FIG. 8B is a block diagram showing the configuration of an adaptive filter according to the embodiment of the present invention.

FIG. 21 is a diagram showing an example of syntax for a filter parameter to be inserted into SEI according to a sixth variation of the embodiment of the present invention.

NUMERICAL REFERENCES

Figure 1:
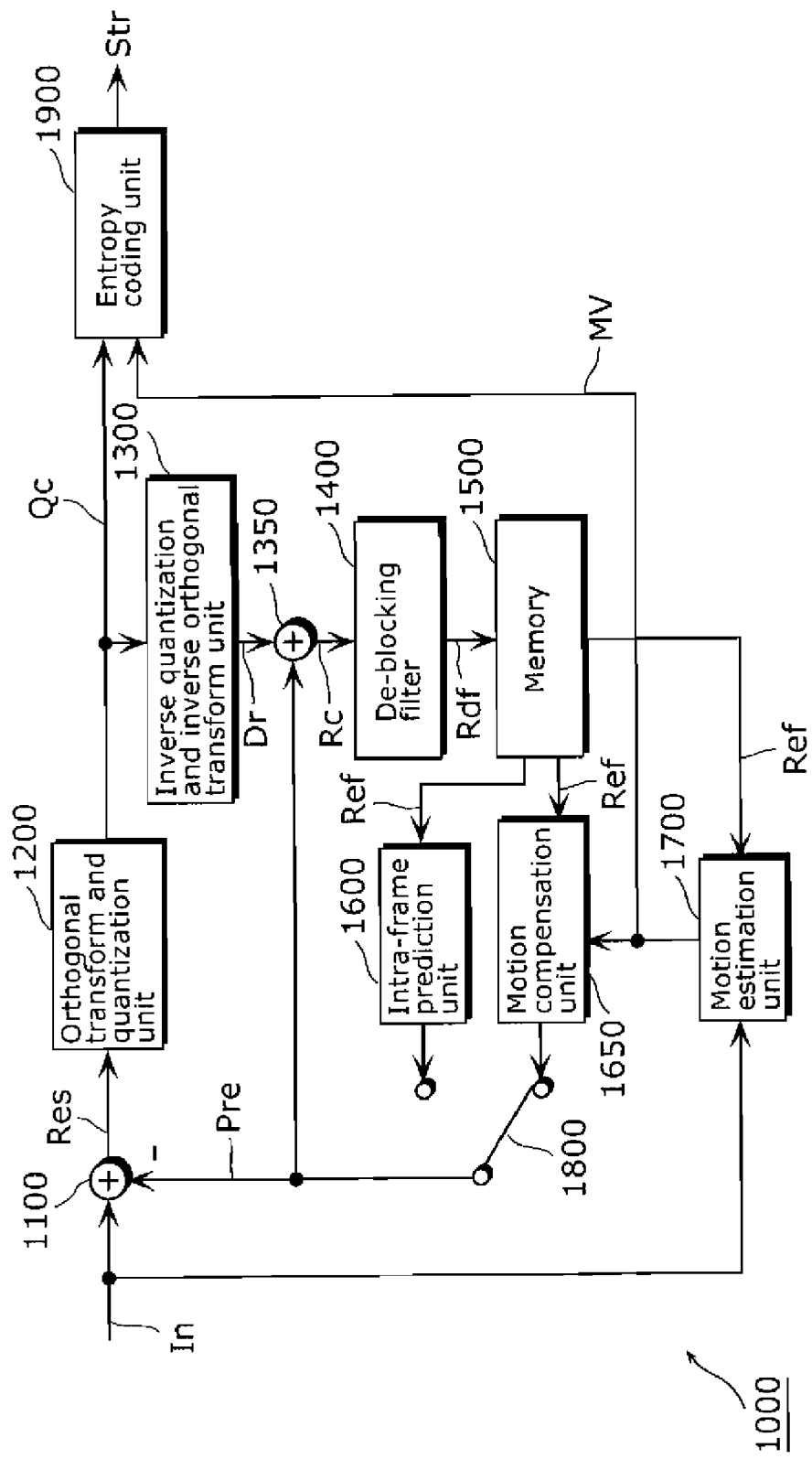
FIG. 1 is a block diagram showing the configuration of a conventional image coding apparatus.
Figure 2:
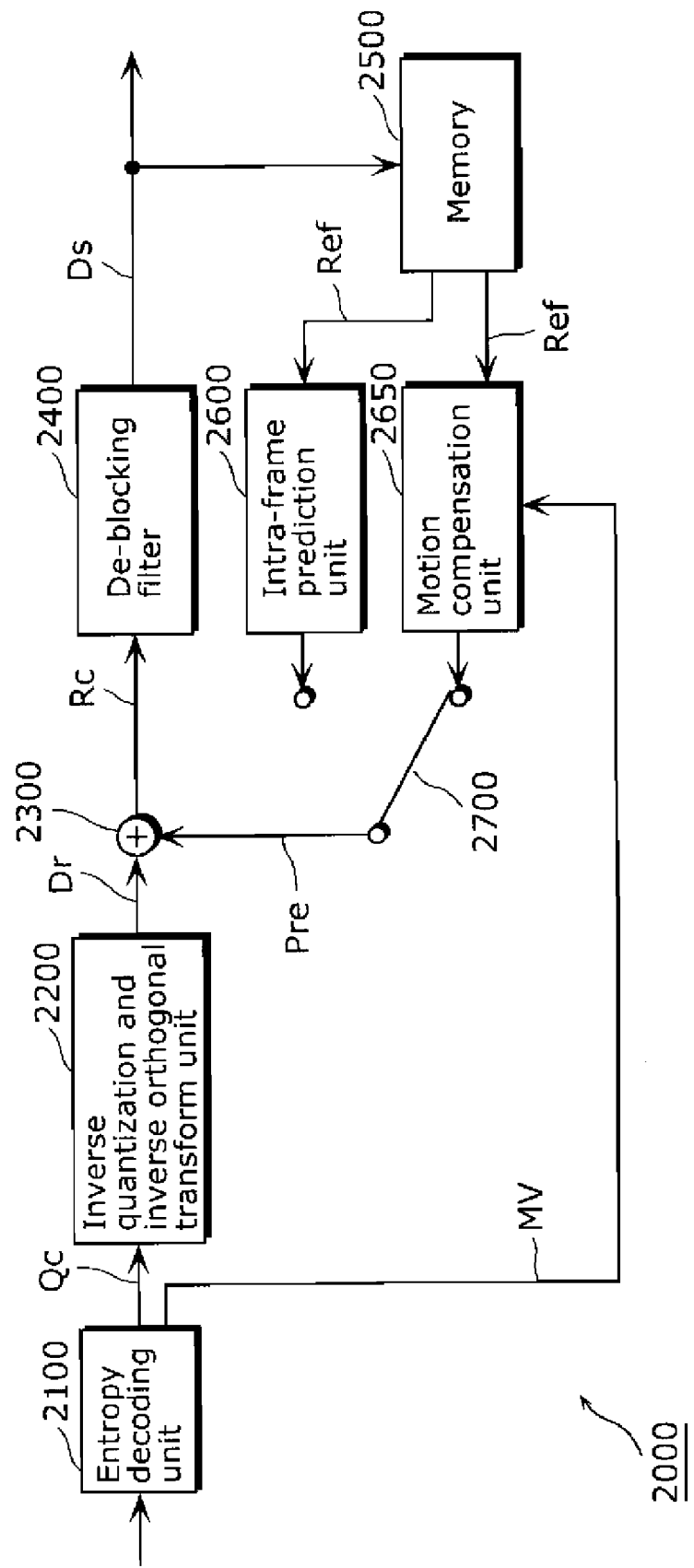
FIG. 2 is a block diagram showing the configuration of a conventional image decoding apparatus.

100 Image coding apparatus
110 Subtractor
120 Orthogonal transform and quantization unit
130 Inverse quantization and inverse orthogonal transform unit
135 Adder
140 Cross-correlation data generation unit
150 Memory
160 Intra-frame prediction unit
165 Motion compensation unit
170 Motion estimation unit
180 Switching unit
190 Entropy coding unit
200 Image decoding apparatus
210 Entropy decoding unit
220 Inverse quantization and inverse orthogonal transform unit
230 Adder
240 Adaptive filter
250 Memory
260 Intra-frame prediction unit
265 Motion compensation unit
270 Switching unit
Dr Prediction error
Ds Output image
In Input image signal
MV Motion vector
P Cross-correlation data
Pre Predictive image
Qc Quantized coefficient
R Auto-correlation data Rc Locally decoded image, decoded image
Ref Reference image
Res Prediction error
Str Coded stream
w Filter parameter

BEST MODE FOR CARRYING OUT THE INVENTION

Hereinafter, with reference to the drawings, an image coding apparatus and an image decoding apparatus according to an embodiment of the present invention shall be described.

Figure 3:
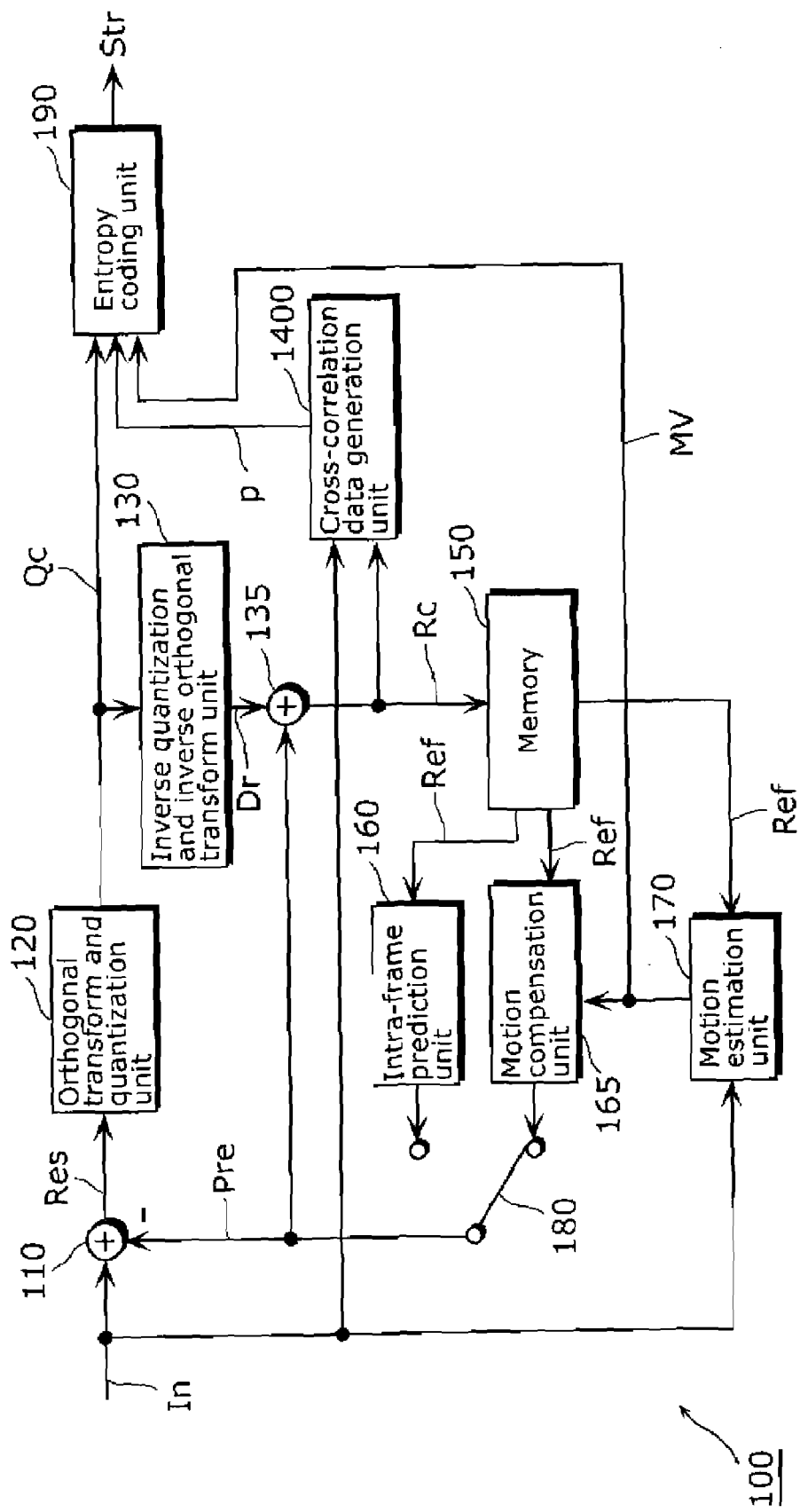
FIG. 3 is a block diagram showing the configuration of an image coding apparatus according to an embodiment of the present invention.

FIG. 3 is a block diagram showing the configuration of the image coding apparatus according to the embodiment of the present invention.

An image coding apparatus 100 according to the present embodiment outputs cross-correlation data to an image decoding apparatus so that the image decoding apparatus can appropriately filter images it has decoded, for preventing deterioration of the image quality.

More specifically, the image coding apparatus 100 according to the present embodiment obtains and codes an input image represented by an input image signal In to generate a coded stream Str; generates cross-correlation data; and inserts the cross-correlation data to the coded stream Str.

The image coding apparatus 100 specifically includes a subtractor 110, an orthogonal transform and quantization unit 120, an inverse quantization and inverse orthogonal transform unit 130, an adder 135, a cross-correlation data generation unit 140, a memory 150, an intra-frame prediction unit 160, a motion compensation unit 165, a motion estimation unit 170, a switching unit 180, and an entropy coding unit 190. It is to be noted that in the present embodiment, the subtractor 110 and the orthogonal transform and quantization unit 120 serve as the coding unit and the inverse quantization and inverse orthogonal transform unit 130 and the adder 135 serve as the decoding unit. Further, the entropy coding unit 190 serves as the insertion unit, and the intra-frame prediction unit 160, the motion compensation unit 165, and the motion estimation unit 170 serve as the prediction unit.

The subtractor 110 calculates, as a prediction error Res, differences between an input image represented by an input image signal In and a predictive image Pre outputted from either the intra-frame prediction unit 160 or the motion compensation unit 165.

The orthogonal transform and quantization unit 120 transforms the prediction error Res calculated by the subtractor 110 to frequency components (by Discrete Cosine Transform, for example), and quantizes each of the frequency components to compress-code them into quantized coefficients Qc.

The inverse quantization and inverse orthogonal transform unit 130 de-quantizes the quantized coefficients Qc outputted from the orthogonal transform and quantization unit 120 to transform the quantized coefficients Qc to a frequency component. Furthermore, by applying an inverse orthogonal transformation to the frequency component (Inverse Discrete Cosine Transform, for example), the inverse quantization and inverse orthogonal transform unit 130 transforms the frequency component to a prediction error Dr.

The adder 135 adds the above mentioned predictive image Pre and prediction error Dr to generate a locally decoded image Rc, and stores the locally decoded image Rc in the memory 150.

When macroblocks in an input image are to be coded in the intra mode, the intra-frame prediction unit 160 extracts one or more locally decoded images Rc corresponding to the input image to be coded from the memory 1500 as reference image(s) Ref, and using TO the reference image(s) Ref, generates a predictive image Pre corresponding to the input image to be coded.

The motion estimation unit 170 refers to, as a reference image Ref, a picture coded prior to the to-be-coded picture in the input image, that is, refers to the locally decoded image Rc stored in the memory 150 to estimate a motion vector MV per macroblock of the to-be-coded picture, for example.

When macroblocks in the input image are to be coded in the inter mode, the motion compensation unit 165 extracts, from the reference images Ref stored in the memory 150, an image of an area (macroblock) indicated by the motion vector MV estimated by the motion estimation unit 170, to output the image as a predictive image Pre.

When the macroblocks are to be coded in the intra mode, the switching unit 180 connects the subtractor 110 to the intra-frame prediction unit 160 so that the subtractor 110 uses, for its processing, the predictive image Pre outputted from the intra-frame prediction unit 160. Alternatively, when the macroblocks are to be coded in the inter mode, the switching unit 180 connects the subtractor 110 to the motion compensation unit 165 so that the subtractor 110 uses, for its processing, the predictive image Pre outputted from the motion compensation unit 165.

Based on the input image represented by the input image signal In and the locally decoded image Rc corresponding to the input image, the cross-correlation data generation unit 140 generates cross-correlation data (a cross-correlation matrix or a cross-correlation vector) p representing a correlation (difference) between the input image and the locally decoded image Rc.

For example, the cross-correlation data generation unit 140 generates a piece of cross-correlation data p for: each block or macroblock included in a picture (hereinafter blocks and macroblocks are simply referred to as blocks); each slice which includes plural blocks; each picture; or each scene or Group Of Pictures (GOP) which include plural pictures. Therefore, when a piece of cross-correlation data p is generated for each picture, the same one piece of cross-correlation data p is used for filtering all the blocks included in the picture. Similarly, when a piece of cross-correlation data p is generated for each slice, the same one piece of cross-correlation data p is used for filtering all the blocks included in the slice.

Further, when input images are coded for each color component such as red (R), green (G) and blue (B), luminance (Y), and chrominance (Cr, Cb), the cross-correlation data generation unit 140 may generate cross-correlation data for each of such color components. As a result, appropriate filtering can be applied depending on each color component.

The entropy coding unit 190 generates a coded stream Str by performing entropy coding (variable-length coding) on the quantized coefficients Qc generated by the orthogonal transform and quantization unit 120, the cross-correlation data p generated by the cross-correlation data generation unit 140, and the motion vector MV estimated by the motion estimation unit 170.

In other words, the entropy coding unit 190 according to the present embodiment performs entropy coding on the cross-correlation data p, and inserts the entropy coded cross-correlation data p into a coded stream Str which includes a coded input image.

Accordingly, when the cross-correlation data generation unit 140 generates cross-correlation data p on a scene-by-scene basis or on a picture-by-picture basis, that is, for each of large spatial areas of an image, the volume of all the cross-correlation data p is small, and thus it possible to suppress the data volume of the coded stream Str. In contrast, when the cross-correlation data generation unit 140 generates cross-correlation data p on a block-by-block basis or on a sequence-by-sequence basis, that is, for each of small spatial areas of an image, filtering can be optimally applied to each block or sequence, and thus it is possible to further improve the image quality.

Such an image coding apparatus 100 as described above codes an input image through generation of a predictive image Pre; orthogonal transformation; quantization; subtraction of the predictive image Pre from the input image; and so on, performed on a block-by-block basis. The image coding apparatus 100 further decodes the coded input image through inverse quantization of quantized coefficients Qc; inverse orthogonal transformation, addition of a prediction error Dr and the predictive image Pre; and so on, performed on a block-by-block basis.

Further, the image coding apparatus 100 according to the present embodiment inserts cross-correlation data p into a coded stream Str as described above, enabling an image decoding apparatus that obtains and decodes the coded stream Str to obtain the cross-correlation data p. As a result, the image decoding apparatus can compute a filter parameter used for a Wiener filter based on the cross-correlation data p, and filter decoded images using the Wiener filter to improve the image quality of the decoded images.

Now, the Wiener filter shall be described in detail.

A filter parameter w used for a Wiener filter can be expressed as (Formula 1) using an auto-correlation matrix R and a cross-correlation vector (cross-correlation data) p. It is to be noted that the auto-correlation matrix R is a matrix made up of M×M elements (where M is a natural number), and when the cross-correlation vector p is made up of M×1 elements, the filter parameter w is represented as a matrix made up of M filter coefficients. Further, $R^{-1}$ is an inverse matrix of the auto-correlation matrix R.

$$w = R^{-1} \times p \quad \text{[Formula 1]}$$

The filter parameter w of a Wiener filter is used for filtering images to be filtered through a convolution performed thereon, and as expressed in (Formula 2) for example, the filter parameter w has nine filter coefficients in the case of a two-dimensional 3×3-tap filter.

$$w = \begin{pmatrix} w_{11} & w_{12} & w_{13} \\ w_{21} & w_{22} & w_{23} \\ w_{31} & w_{32} & w_{33} \end{pmatrix} \quad \text{[Formula 2]}$$

When a filter parameter w having 3×3 filter coefficients as expressed in (Formula 2) is to be computed, the auto-correlation matrix R has 9×9 elements as expressed in (Formula 3).

$$R = \begin{pmatrix} R_{11} & \Lambda & R_{19} \\ M & O & M \\ R_{91} & \Lambda & R_{99} \end{pmatrix} \quad \text{[Formula 3]}$$

Further, when the filter parameter w having 3×3 filter coefficients as expressed in (Formula 2) is to be computed, the cross-correlation vector p has 9×1 elements as expressed in (Formula 4).

$$p = \begin{pmatrix} p_1 \\ M \\ p_9 \end{pmatrix} \quad \text{[Formula 4]}$$

The cross-correlation vector p is estimated based on an input image and a locally decoded image Rc, and the auto-correlation matrix R is estimated based only on the locally decoded image Rc. Then, the matrix operation of (Formula 1) is performed to obtain a filter parameter w made up 3×3 filter coefficients as expressed in (Formula 5).

$$w_{3\times3} = \begin{pmatrix} -0.03495 & 0.05748 & -0.02351 \\ 0.05896 & 0.88896 & 0.05978 \\ -0.02719 & 0.06011 & -0.03945 \end{pmatrix} \quad \text{[Formula 5]}$$

For example, when a filtering is to be performed using a filter parameter w obtained for an image, a matrix operation expressed as (Formula 6) is performed. To be more specific, a matrix is generated which is made up of a value of a pixel (229) which is in the image and is to be filtered, and values of neighboring pixels (192, 225, 225, and so on). Then, the product of the matrix made up of the pixel values and the above described filter parameter w is computed. Such a filtering operation (matrix operation) shows that the above mentioned pixel value (229) becomes 227.47.

$$S_f = \begin{pmatrix} 192 & 225 & 255 \\ 146 & 229 & 255 \\ 132 & 198 & 252 \end{pmatrix} \cdot w = 227.47 \quad \text{[Formula 6]}$$

It is to be noted that the pixel value 227.47, indicating the result of the filtering operation, becomes 227, since all digits to the right of the decimal point are discarded.

The above described image decoding apparatus which obtains coded streams Str is capable of employing the above mentioned Wiener filter by extracting cross-correlation data (cross-correlation vector) p from the coded streams Str. That is, the image decoding apparatus generates a decoded image by decoding a coded stream Str and generates an auto-correlation matrix R based on the decoded image. Then, the image decoding apparatus can compute a filter parameter w used for a Wiener filter, based on the auto-correlation matrix R and the cross-correlation vector p as expressed in (Formula 1).

As a result, the image decoding apparatus can remove the noise contained in the decoded images, such as block distortions and quantized noise, by performing a filtering operation on each pixel of the decoded image using the filter parameter was expressed in (Formula 6); and bring the image quality of the decoded image close to that of the corresponding input image.

That is to say, decoding previously coded input images causes the decoded images to be inferior in image quality to the corresponding input images, since such coding and decoding causes block distortions and quantized noise to occur in the decoded images. Wiener filters are designed to minimize the difference between input images and images obtained through a filter applied to the decoded images (a square mean value of a difference in pixel values). Thus, applying a Wiener filter to the decoded images makes it possible to reliably bring the decoded images close to the original input images.

In the example set forth above, the number of filter coefficients included in a filter parameter w is 3×3 (the number of taps). It is to be noted, however, that any number of filter coefficients is possible. For instance, there may be 7×7 filter coefficients. Furthermore, in the above example, the filter parameter w is a two-dimensional matrix. However, it may be a one-dimensional matrix. In addition, by increasing the number of filter coefficients, the accuracy of the filter can be improved.

FIG. 4 is a diagram showing the structure of a coded stream Str.

The coded stream Str includes a plurality of Group Of Pictures (GOPs) each of which is a group of coded pictures. Further, each GOP comprises a plurality of pictures, and a Sequence Parameter Set (SPS) which includes a plurality of parameters used for decoding all the pictures included in the GOP.

Further, each picture includes a Picture Parameter Set (PPS) which includes parameters used for decoding the picture; SEI which is Supplementary Enhancement information; and one or more slices to be decoded using the SEI, in the listed sequence. Further, each picture includes one or more pairs of the above mentioned SEI and one or more slices.

For example, in the case where the cross-correlation data generation unit 140 generates cross-correlation data p on a slice-by-slice basis, the entropy coding unit 190 inserts cross-correlation data p generated for a slice, into SEI which is located before the slice and is used for decoding that slice. In such a case, the same cross-correlation data p is used for filtering all the blocks included in that slice.

Further, in the case where one piece of SEI is to be assigned to plural slices, the entropy coding unit 190 inserts, into that one piece of SEI, cross-correlation data p which is generated to be used for all of the plural slices. In this case, the same cross-correlation data p is used for filtering all the blocks included in the plural slices.

In such a manner, cross-correlation data p is inserted into SEI which is the header of a coded picture.

FIG. 5 is a diagram showing an example of syntax for SEI.

Inserted into SEI is information necessary according to the payload type. For example, when the payload type is 22, cross-correlation data p is inserted into an additional data field of SEI. That is to say, the cross-correlation data p is inserted into the SEI as optional post-filter hints.

As a result, the image decoding apparatus according to the present embodiment can perform a filtering using a Wiener filter by extracting the cross-correlation data p included in the SEI of the coded stream Str. Furthermore, even when conventional image decoding apparatuses obtain the coded streams Str of the present embodiment, the conventional image decoding apparatuses can skip the cross-correlation data p included in the SEI of the coded streams Str, and thus can still perform decoding in the conventional manner. In other words, the coded streams Str according to the present embodiment have compatibility with conventional coded streams Str.

FIG. 6 is a diagram showing an example of syntax for cross-correlation data p.

Inserted into SEI as information indicating cross-correlation data p are the number of elements included in a matrix p (number_of_elements), the scaling factor for the elements (scaling_factor), and the respective values of the elements (filter_hint[element]). It is to be noted that in image decoding apparatuses, the value of each element of the cross-correlation data p is used after being divided by the scaling factor indicated by the scaling_factor.

Figure 7:
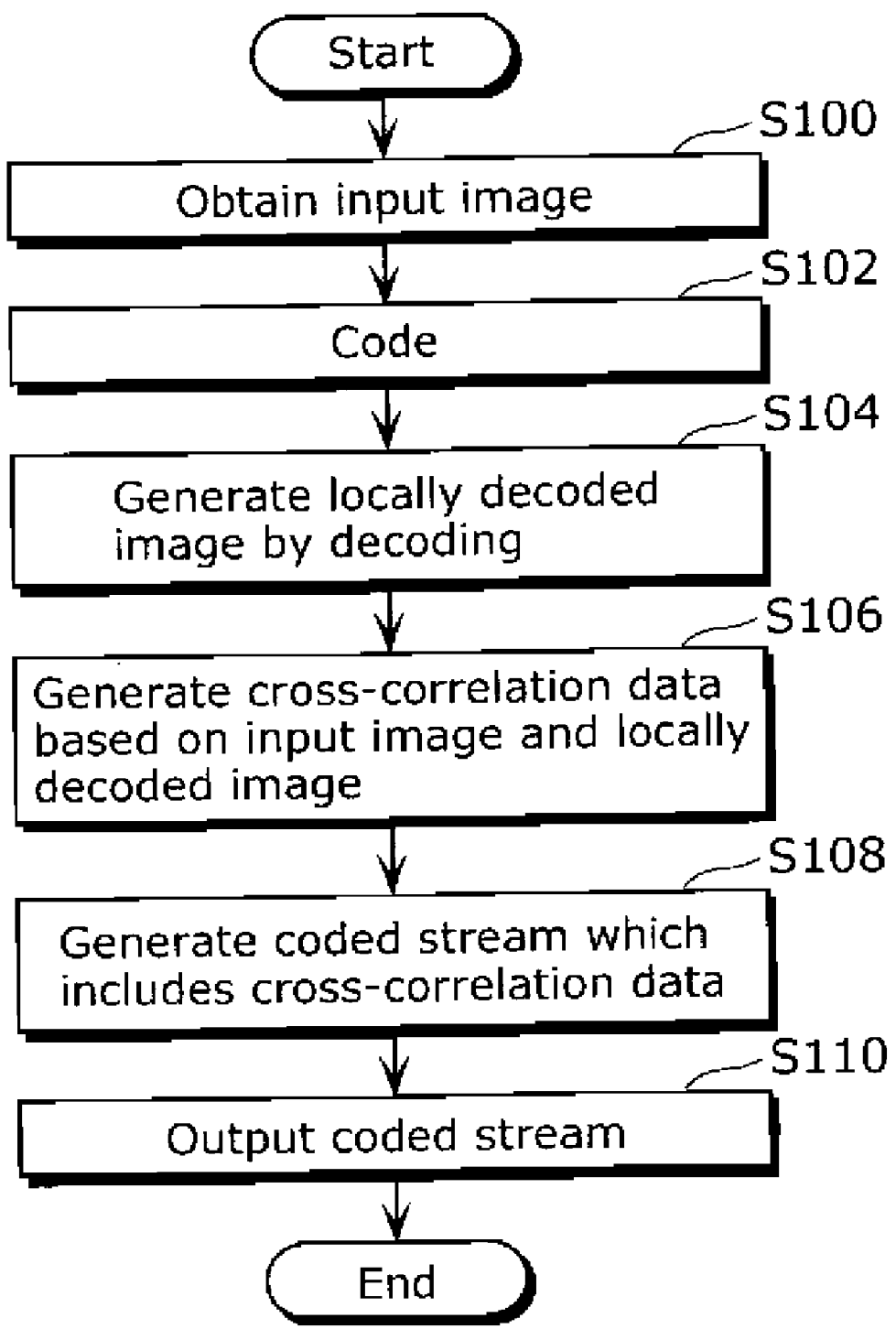
FIG. 7 is a flow chart showing operations of an image coding apparatus according to the embodiment of the present invention.

FIG. 7 is a flow chart showing operations of the image coding apparatus 100 according to the present embodiment.

Initially, the image coding apparatus 100 obtains an input image represented by an input image signal In (Step S100), and generates quantized coefficients Qc by coding the input image (Step S102). Further, the image coding apparatus 100 generates a locally decoded image Rc by decoding the quantized coefficients Qc (Step S104).

Then, the image coding apparatus 100 generates cross-correlation data p based on the input image and the locally decoded image Rc corresponding to the input image (Step S106). The image coding apparatus 100 generates a coded stream Str which includes the generated cross-correlation data p by performing entropy coding on the cross-correlation data p and the quantized coefficients Qc (Step S108). In other words, the image coding apparatus 100 inserts the cross-correlation data p into the coded stream Str which includes the coded input image. Then, the image coding apparatus 100 outputs the coded stream Str (Step S110).

It is to be noted that the entropy coding unit 190 of the image coding apparatus 100 according to the present embodiment may insert, into the coded stream Str, identification information indicating which image area of a coded picture and so on should be filtered, as well as inserting the cross-correlation data p. By doing so, image decoding apparatuses can apply a Wiener filter only on the image area indicated by the identification information (e.g. I picture, P picture, B picture, or the like).

FIG. 8A is a block diagram showing the configuration of an image decoding apparatus according to the present embodiment.

An image decoding apparatus 200 according to the present embodiment is capable of preventing deterioration in the image quality by appropriately filtering decoded images using cross-correlation data p transmitted from the image coding apparatus 100.

In other words, the image decoding apparatus 200 according to the present embodiment extracts cross-correlation data p from coded streams Str as well as generating decoded images by obtaining and decoding coded streams Str outputted from the image coding apparatus 100. Then, using the cross-correlation data p, the image decoding apparatus 200 computes a filter parameter w used for a Wiener filter, and filters the decoded images using the computed filter parameter w.

Specifically, the image decoding apparatus 200 includes an entropy decoding unit 210, an inverse quantization and inverse orthogonal transform unit 220, an adder 230, an adaptive filter 240, a memory 250, an intra-frame prediction unit 260, a motion compensation unit 265, and a switching unit 270. It is to be noted that in the present embodiment the inverse quantization and inverse orthogonal transform unit 220 and the adder 230 serve as the decoding unit, and the entropy decoding unit 210 serves as the extraction unit. Further, the adaptive filter 240 serves as the parameter computation unit and a filtering unit, and the intra-frame prediction unit 260 and the motion compensation unit 265 serve as the prediction unit.

The entropy decoding unit 210 obtains a coded stream Str and performs entropy decoding (variable-length decoding) thereon. Then the entropy decoding unit 210 extracts quantized coefficients Qc, cross-correlation data p, and a motion vector MV from the entropy decoded coded stream Str.

The inverse quantization and inverse orthogonal transform unit 220 obtains the quantized coefficients Qc extracted by the entropy decoding unit 210, and de-quantizes the quantized coefficients Qc to transform them to frequency components. Furthermore, by applying an inverse orthogonal transformation to the frequency component (Inverse Discrete Cosine Transform, for example), the inverse quantization and inverse orthogonal transform unit 220 transforms the frequency component to a prediction error Dr.

The adder 230 adds the prediction image Pre, outputted from the intra-frame prediction unit 260 or from the motion compensation unit 265, to the prediction error Dr outputted from the inverse quantization and inverse orthogonal transform unit 220 to generate a decoded image Rc. Further, the adder 230 outputs the generated decoded image Rc to the adaptive filter 240 and stores the same in the memory 250.

When macroblocks in the coded stream Str are to be decoded in the intra mode, the intra-frame prediction unit 260 extracts, as reference image(s) Ref, one or more locally decoded images Rc corresponding to the prediction error Dr from the memory 250, and generates a predictive image Pre using the reference image(s) Ref.

When macroblocks included in the coded stream Str are to be decoded in the inter mode, the motion compensation unit 265 extracts, from a reference image Ref stored in the memory 250, an image of an area indicated by the motion vector MV extracted by the entropy decoding unit 210, to output the image as a predictive image Pre.

When the macroblocks are to be decoded in the intra mode, the switching unit 270 connects the adder 230 to the intra-frame prediction unit 260 so that the adder 230 uses, for its processing, the predictive image Pre outputted from the intra-frame prediction unit 260. Alternatively, when the macroblocks are to be decoded in the inter mode, the switching unit 270 connects the adder 230 to the motion compensation unit 265 so that the adder 230 uses, for its processing, the predictive image Pre outputted from the motion compensation unit 265.

The adaptive filter 240 obtains the cross-correlation data p extracted by the entropy decoding unit 210 and the decoded image Rc outputted from the adder 230. Then, the adaptive filter 240 computes a filter parameter w used for a Wiener filter based on the cross-correlation data p, and using the computed filter parameter w, applies, to the decoded image Rc, a filtering adaptive to the decoded image Rc. As a result, the adaptive filter 240 outputs the filtered decoded image Rc as an output image Ds.

FIG. 8B is a block diagram showing the configuration of the adaptive filter 240.

The adaptive filter 240 includes an auto-correlation data generation unit 241, a filter parameter computation unit 242, and a filtering unit 243.

The auto-correlation data generation unit 241 generates an auto-correlation matrix (auto-correlation data) R by obtaining and analyzing a decoded image Rc, and outputs the generated auto-correlation matrix R.

The filter parameter computation unit 242 computes a filter parameter w used for a Wiener filter by performing an operation using the auto-correlation matrix R and cross-correlation data p as expressed in (Formula 1).

The filtering unit 243 filters the decoded image Rc using the filter parameter w. That is, as expressed in (Formula 6), the filtering unit 243 applies a filter on the decoded image Rc using the filter parameter w. Such filtering generates an output image Ds which is then outputted.

As a result, it is possible to remove the noise contained in the decoded image Rc, such as block distortions and quantized noise, and to bring the image quality of the filtered decoded image Rc, that is, the output image Ds, close to that of the corresponding input image.

It is to be noted that the adaptive filter 240 may apply a filter only on I-pictures, or, apply a filter on all of I-pictures, P-pictures, and B-pictures. That is to say, the adaptive filter 240 obtains the above mentioned identification information extracted by the entropy decoding unit 210 from a coded stream Str, and applies a filter only on the image area indicated by the identification information.

Such an image decoding apparatus 200 as described above performs decoding through inverse quantization of quantized coefficients Qc; inverse orthogonal transformation; addition of a prediction error Dr and a predictive image Pre, and so on, performed on a block-by-block basis.

Figure 9:
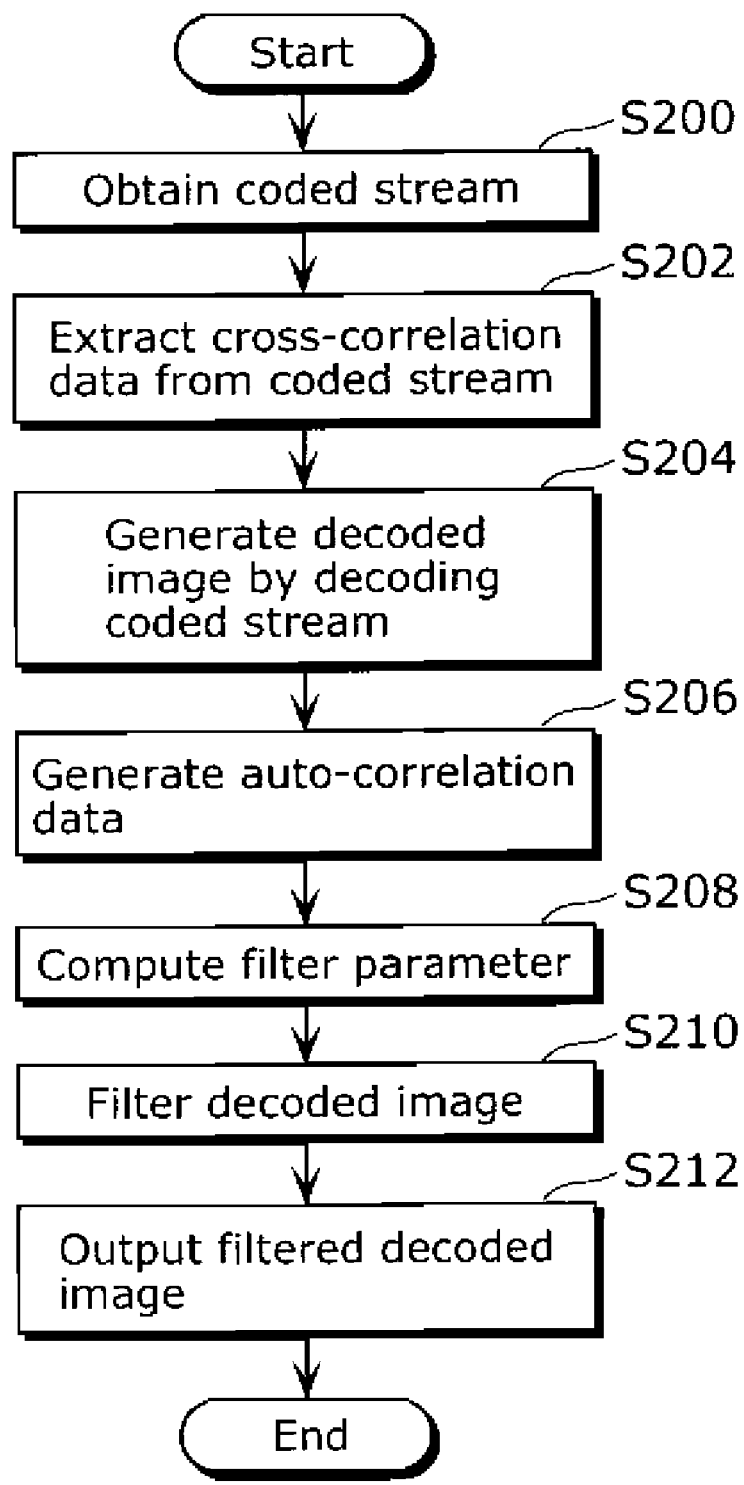
FIG. 9 is a flow chart showing operations of an image decoding apparatus according to the embodiment of the present invention.

FIG. 9 is a flow chart showing operations of the image decoding apparatus 200 according to the present embodiment.

The image decoding apparatus 200 obtains a coded stream Str (Step S200), and performs entropy decoding on the coded stream Str to extract cross-correlation data p from the entropy decoded coded stream Str (Step S202).

Furthermore, the image decoding apparatus 200 generates a decoded image Rc by further decoding the entropy decoded coded stream Str (Step S204). To be more specific, the image decoding apparatus 200 generates a decoded image Rc by performing inverse quantization on the quantized coefficients Qc included in the entropy decoded coded stream Str; inverse orthogonal transformation to the result of the inverse quantization; and further, addition of a predictive image Pre to the result of the inverse orthogonal transformation.

Then, the image decoding apparatus 200 generates auto-correlation data R based on the decoded image Rc (Step S206), and computes a filter parameter w used for a Wiener filter adaptive to the cross-correlation data p extracted in Step S202 and the auto-correlation data R (Step S208).

The image decoding apparatus 200 filters the decoded image Rc using the computed filter parameter w (Step S210), and outputs the filtered decoded image Rc as an output image Ds (Step S212).

As described above, the image decoding apparatus 200 according to the present embodiment extracts cross-correlation data p from a coded stream Str to compute a filter parameter w used for a Wiener filter, and filters a decoded image Rc according to the computed filter parameter w. By doing so, it is possible to bring the image quality of an output image Ds, that is, the filtered decoded image Rc, close to that of the corresponding input image. Further, since the image decoding apparatus 200 extracts the cross-correlation data p without having to extract a filter parameter w used for a Wiener filter from the coded stream Str; it is possible to compute and use a filter parameter w adaptive to the status of the image decoding apparatus 200 (status of resources).

For example, when the image decoding apparatus 200 is provided in a mobile terminal having a slow processor and a small display, the image decoding apparatus 200 computes a filter parameter w having a small number of filter coefficients. Then, the image decoding apparatus 200 performs filtering using the computed filter parameter w in a simple manner. On the other hand, when the image decoding apparatus 200 is provided in a high-performance terminal having a fast processor and a large display, the image decoding apparatus 200 computes a filter parameter w having a larger number of filter coefficients. Then, the image decoding apparatus 200 performs filtering using the computed filter parameter w in a complex manner.

Further, even with the same image decoding apparatus 200, it may compute different filter parameters w for the same cross-correlation data p. For example, when the image decoding apparatus 200 is in a power-saving mode, it computes a filter parameter w having a small number of filter coefficients, and in a high-image-quality mode, it computes a filter parameter w having a larger number of filter coefficients.

Further, irrespective of image areas for which cross-correlation data p is used, the auto-correlation data generation unit 241 of the image decoding apparatus 200 may generate a piece of auto-correlation data R for each of any image areas, for example: for each block included in a picture; for each slice which includes plural blocks; for each picture; or for each scene or Group Of Pictures (GOP) which include plural pictures. In such a case, the filter parameter computation unit 242 can compute a filter parameter w that is appropriate for each of the image areas, and thus can, using the computed filter parameter w, reliably bring the image quality of an output image Ds, that is, the filtered decoded image Rc, close to the image quality of the corresponding input image.

In other words, the image decoding apparatus 200 can enhance the degree of flexibility of filter parameters w.

(First Variation)

Hereinafter, an image coding apparatus and an image decoding apparatus according to a first variation of the above described embodiment of the present invention shall be described.

The image coding apparatus according to the present variation is characterized in that it applies, to a locally decoded image Rc, a filtering which is adaptive thereto, and stores the filtered locally decoded image Rc in the memory 150 as a reference image Ref.

Figure 10:
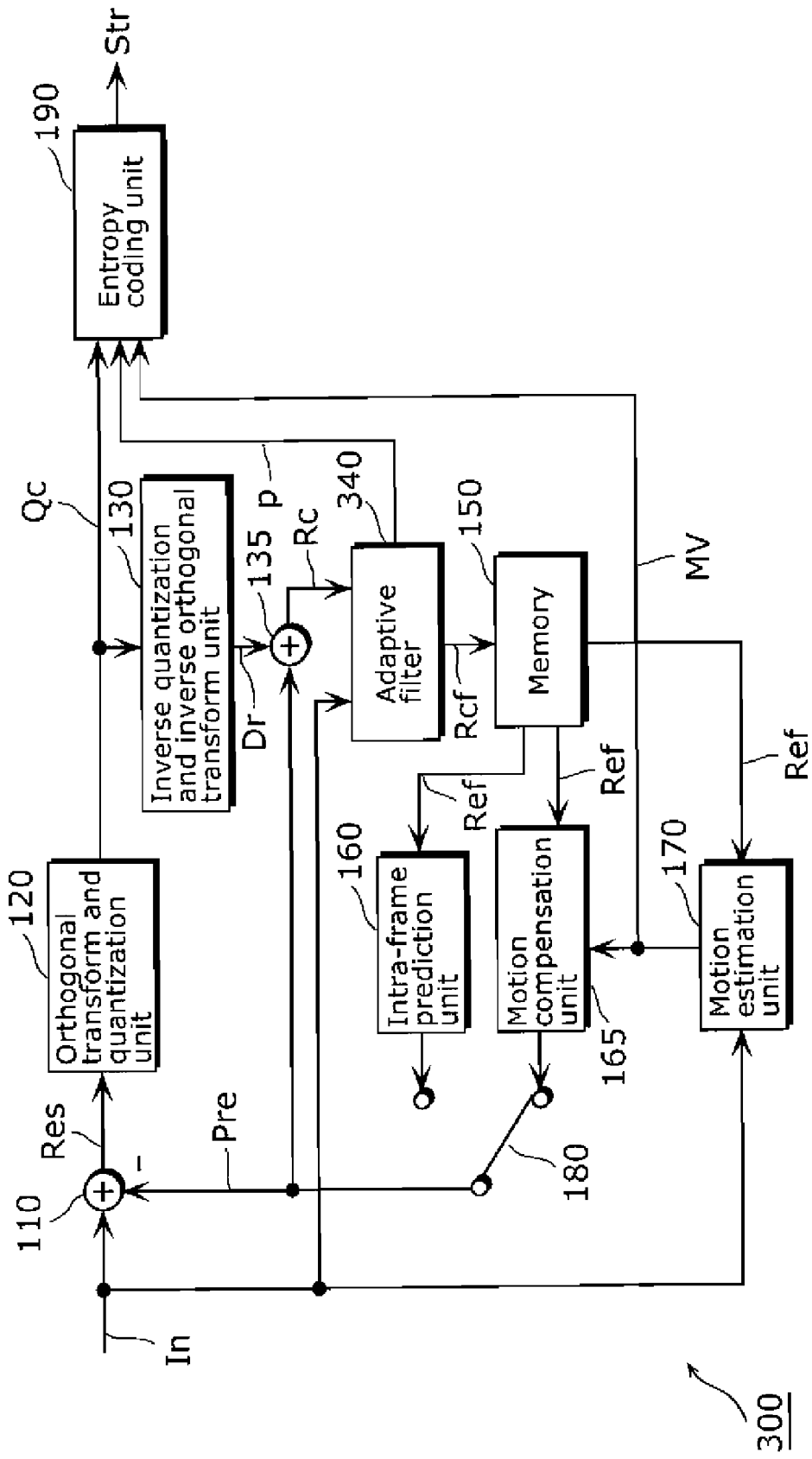
FIG. 10 is a block diagram showing the configuration of an image coding apparatus according to a first variation of the embodiment of the present invention.

FIG. 10 is a block diagram showing the configuration of the image coding apparatus according to the present variation.

An image coding apparatus 300 according the present variation includes an adaptive filter 340 instead of the cross-correlation data generation unit 140 included in the image coding apparatus 100 of the above described embodiment.

The adaptive filter 340 generates cross-correlation data p and auto-correlation data R based on a locally decoded image Rc and a corresponding input image. In addition, the adaptive filter 340 computes a filter parameter w used for a Wiener filter, based on the generated cross-correlation data p and auto-correlation data R. Then, the adaptive filter 340 outputs the cross-correlation data p to the entropy coding unit 190, and filters the locally decoded image Rc using the computed filter parameter w. As a result, the adaptive filter 340 stores the filtered locally decoded image Rc in the memory 150 as a filtered decoded image Rcf.

That is, in the present variation, the adaptive filter 340 serves as the parameter computation unit and the filtering unit.

In this way, it is possible to improve the image quality of the reference images Ref used by the intra-frame prediction unit 160, the motion compensation unit 165, and the motion estimation unit 170, and the image quality of predictive images Pre to the extent that they are close to the image quality of corresponding input images. In addition, since the predictive images Pre approach to the corresponding input images, it is possible to reduce the data volume of the prediction errors Res, and thus, the data volume of coded streams Str can be suppressed.

Figure 11:
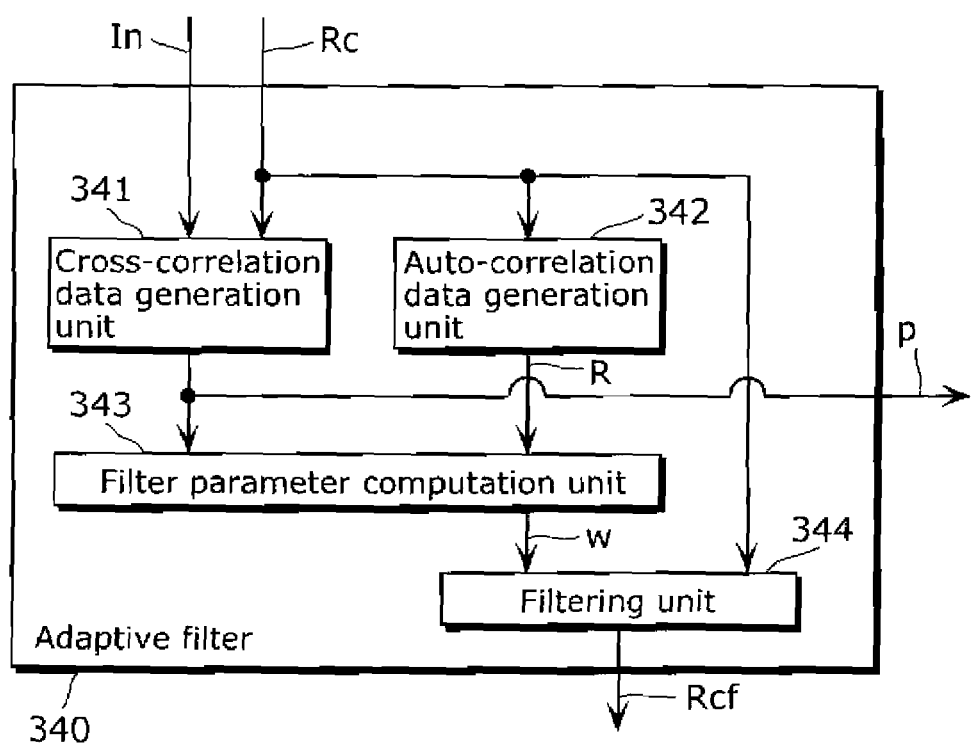
FIG. 11 is a block diagram showing the configuration of an adaptive filter according to the first variation of the embodiment of the present invention.

FIG. 11 is a block diagram showing the configuration of the adaptive filter 340 according to the present variation.

The adaptive filter 340 includes a cross-correlation data generation unit 341, an auto-correlation data generation unit 342, a filter parameter computation unit 343, and a filtering unit 344.

The cross-correlation data generation unit 341 generates cross-correlation data (a cross-correlation vector) p based on an input image represented by an input image signal In and a locally decoded image Rc corresponding to the input image. For example, the cross-correlation data generation unit 341 generates cross-correlation data p for each picture, or for each block, macroblock, or slice which are included in a picture.

The auto-correlation data generation unit 342 generates auto-correlation data R, which is an auto-correlation matrix, by obtaining and analyzing a locally decoded image Rc, and outputs the generated auto-correlation data R.

The filter parameter computation unit 343 computes a filter parameter w used for a Wiener filter by performing an operation using the auto-correlation data R and the cross-correlation data p.

The filtering unit 344 filters the locally decoded image Rc using the filter parameter w to generate a filtered decoded image Rcf, and stores the generated filtered decoded image Rcf in the memory 150.

Figure 12:
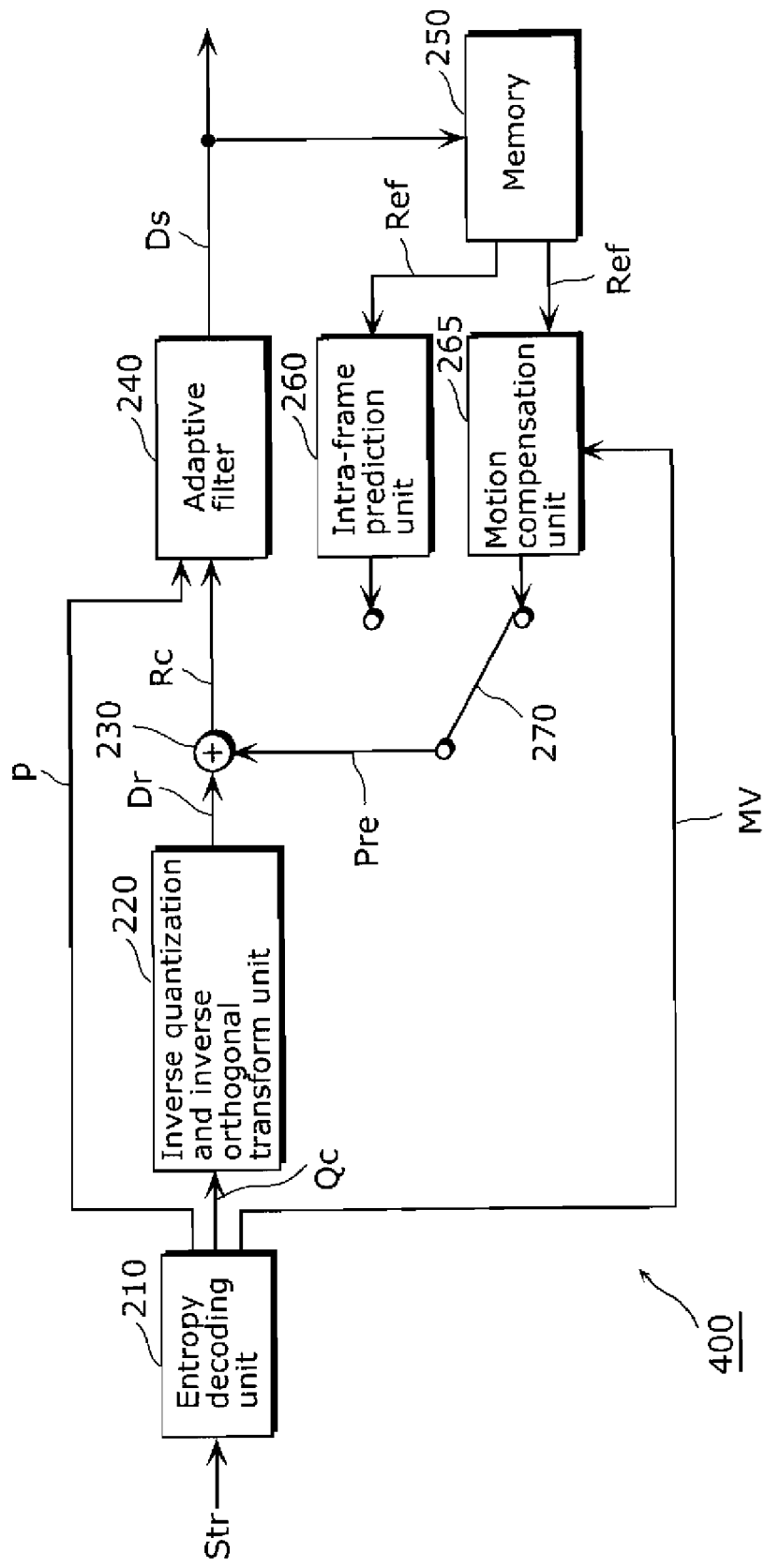
FIG. 12 is a block diagram showing the configuration of an image decoding apparatus according to the first variation of the embodiment of the present invention.

FIG. 12 is a block diagram showing the configuration of an image decoding apparatus according to the present variation.

An image decoding apparatus 400 according to the present variation is an apparatus which decodes coded streams Str generated by the image coding apparatus 300 according to the present variation.

More specifically, the image decoding apparatus 400 according to the present variation does not store decoded images Rc in the memory 250 as the image decoding apparatus 200 does in the above embodiment, but stores output images Ds outputted from the adaptive filter 240 in the memory 250 as reference images Ref. That is to say, the adaptive filter 240 outputs the output images Ds, and stores the output images Ds in the memory 250 to be used as reference images Ref.

As a result, the image decoding apparatus 400 according to the present variation can generate predictive images Pre which are identical to the predictive images Pre generated by the image coding apparatus 300, and appropriately decode coded streams Str generated by the image coding apparatus 300.

(Second Variation)

Hereinafter, an image coding apparatus and an image decoding apparatus according to a second variation of the above described embodiment of the present invention shall be described.

The image coding apparatus according to the present variation is characterized in that it includes a de-blocking filter as well as each of the constituent elements of the image coding apparatus 300 of the above described first variation.

Figure 13:
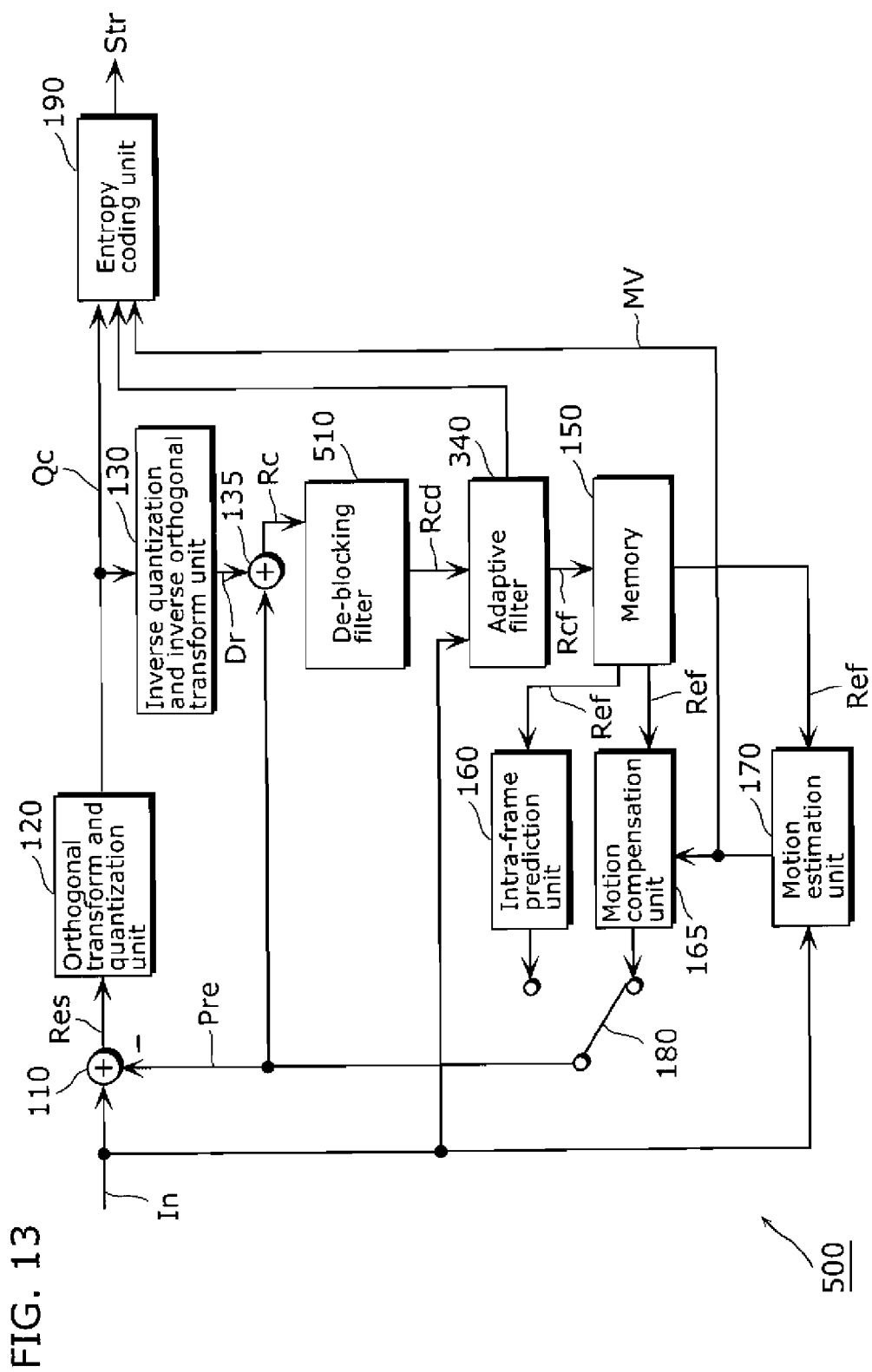
FIG. 13 is a block diagram showing the configuration of an image coding apparatus according to a second variation of the embodiment of the present invention.

FIG. 13 is a block diagram showing the configuration of the image coding apparatus according to the present variation.

An image coding apparatus 500 according to the present variation includes a de-blocking filter 510 as well as each of the constituent elements of the image coding apparatus 300 of the above described first variation.

The de-blocking filter 510 filters a locally decoded image Rc outputted from the adder 135 to remove block distortions therefrom. Then, the de-blocking filter 510 outputs the filtered locally decoded image Rc to the adaptive filter 340 as a locally decoded image Rcd. Such processing performed by the de-blocking filter 510 is the same as that of conventional de-blocking filters.

The adaptive filter 340 generates, as in the above described first variation, cross-correlation data p and auto-correlation data R based on a locally decoded image Rcd and a corresponding input image. In addition, the adaptive filter 340 computes a filter parameter w used for a Wiener filter, based on the generated cross-correlation data p and auto-correlation data R. Then, the adaptive filter 340 outputs the cross-correlation data p to the entropy coding unit 190, and filters the locally decoded image Rcd using the computed filter parameter w. As a result, the adaptive filter 340 stores the filtered locally decoded image Rcd in the memory 150 as a filtered decoded image Rcf.

Figure 14:
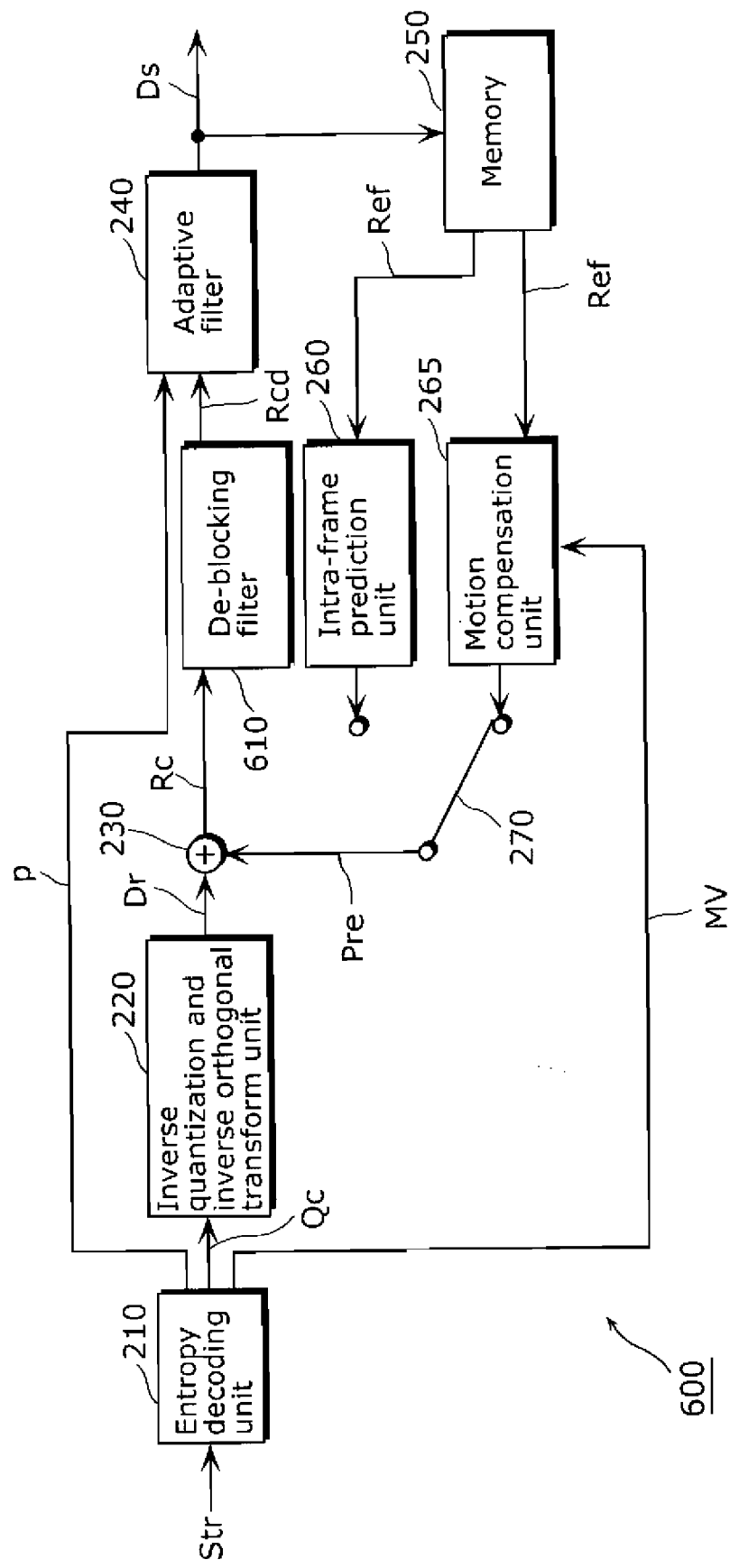
FIG. 14 is a block diagram showing the configuration of an image decoding apparatus according to the second variation of the embodiment of the present invention.

FIG. 14 is a block diagram showing the configuration of the image decoding apparatus according to the present variation.

An image decoding apparatus 600 according to the present variation is an apparatus which decodes coded streams Str generated by the image coding apparatus 500 according to the present variation, and is characterized in that it applies a de-blocking filter to decoded images Rc.

The image decoding apparatus 600 includes a de-blocking filter 610 as well as each of the constituent elements of the image decoding apparatus 400 of the above described first variation.

The de-blocking filter 610 filters a decoded image Rc outputted from the adder 230 to remove block distortions therefrom. Then, the de-blocking filter 610 outputs the filtered decoded image Rc to the adaptive filter 240 as a decoded image Rcd. Such processing performed by the de-blocking filter 610 is the same as that of the conventional de-blocking filters.

The adaptive filter 240 obtains cross-correlation data p extracted by the entropy decoding unit 210 and the decoded image Rcd outputted from the de-blocking filter 610. Then, the adaptive filter 240 computes a filter parameter w used for a Wiener filter, based on the cross-correlation data p, and, using the computed filter parameter w, filters the decoded image Rcd with a filter adaptive thereto. As a result, the adaptive filter 240 outputs the filtered decoded image Rcd as an output image Ds. Furthermore, the adaptive filter 240 stores the output image Ds in the memory 250 to be used as a reference image Ref.

As described above, in the present variation, having the de-blocking filters 510 and 516 and the adaptive filters 340 and 240 enables further improvement of the image quality of decoded images (output images). In addition, providing the adaptive filters 340 and 240 in conventional image coding apparatuses and conventional image decoding apparatuses respectively, enables easy implementation of the present variation.

(Third Variation)

Hereinafter, an image coding apparatus and an image decoding apparatus according to a third variation of the above described embodiment of the present invention shall be described.

The image coding apparatus according to the present variation includes an adaptive filter 340 as the image coding apparatus 300 of the above described first variation does, but is characterized in that the image coding apparatus of the present variation generates cross-correlation data p based on a predictive image Pre and filters the predictive image Pre.

Figure 15:
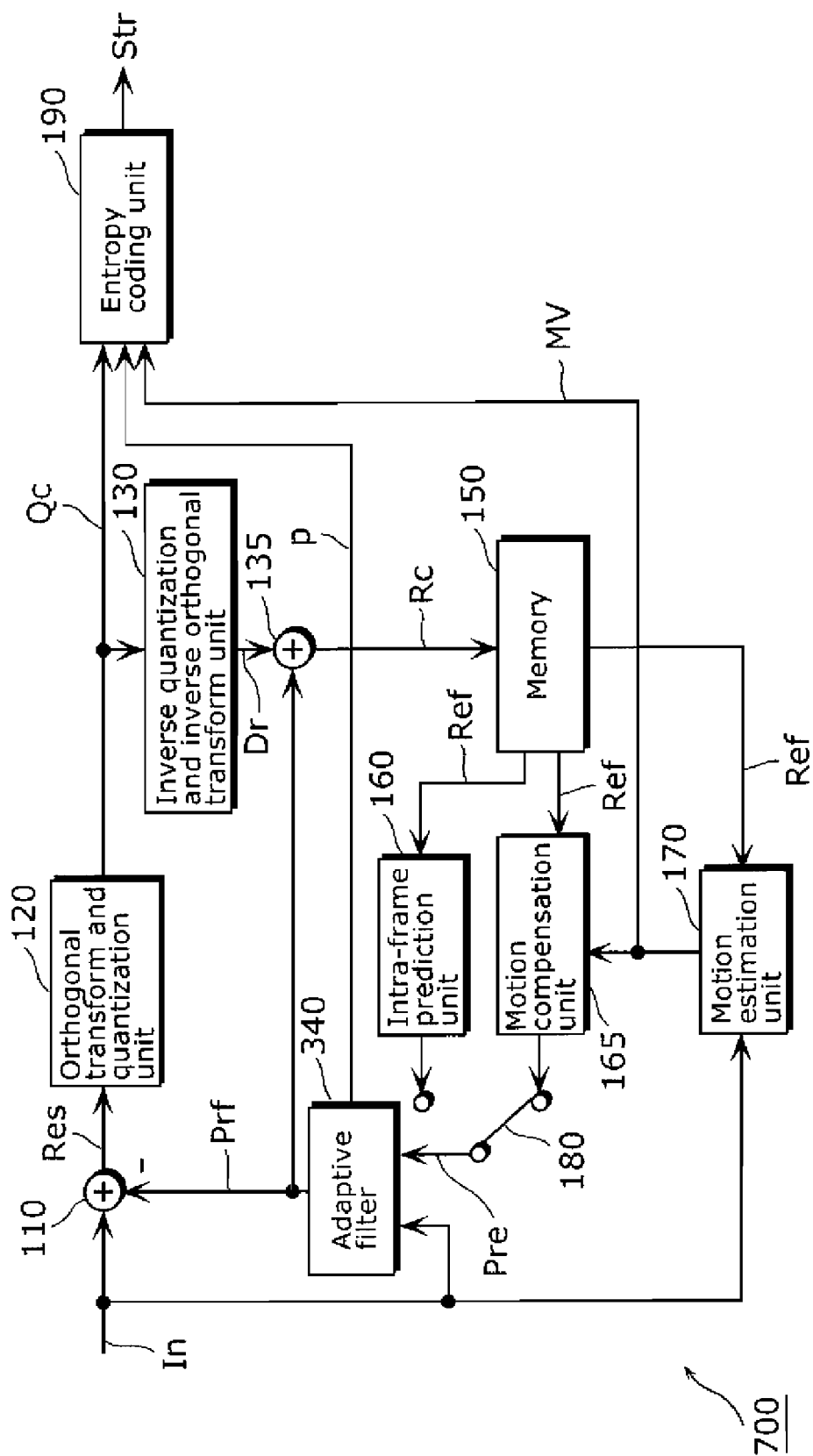
FIG. 15 is a block diagram showing the configuration of an image coding apparatus according to a third variation of the embodiment of the present invention.

FIG. 15 is a block diagram showing the configuration of the image coding apparatus according to the present variation.

The adaptive filter 340 of an image coding apparatus 700 according to the present variation generates cross-correlation data p and auto-correlation data R based on a predictive image Pre and a corresponding input image. In addition, the adaptive filter 340 computes a filter parameter w used for a Wiener filter, based on the generated cross-correlation data p and auto-correlation data R. Then, the adaptive filter 340 outputs the cross-correlation data p to the entropy coding unit 190, and filters the predictive image Pre using the computed filter parameter w. As a result, the adaptive filter 340 outputs the filtered predictive image Pre to the subtractor 110 and the adder 135 as a filtered predictive image Prf.

The subtractor 110 and the adder 135 handle the filtered predictive image Prf outputted from the adaptive filter 340 in the same manner as with the predictive image Pre, and perform the same processing as that in the above described embodiment.

Figure 16:
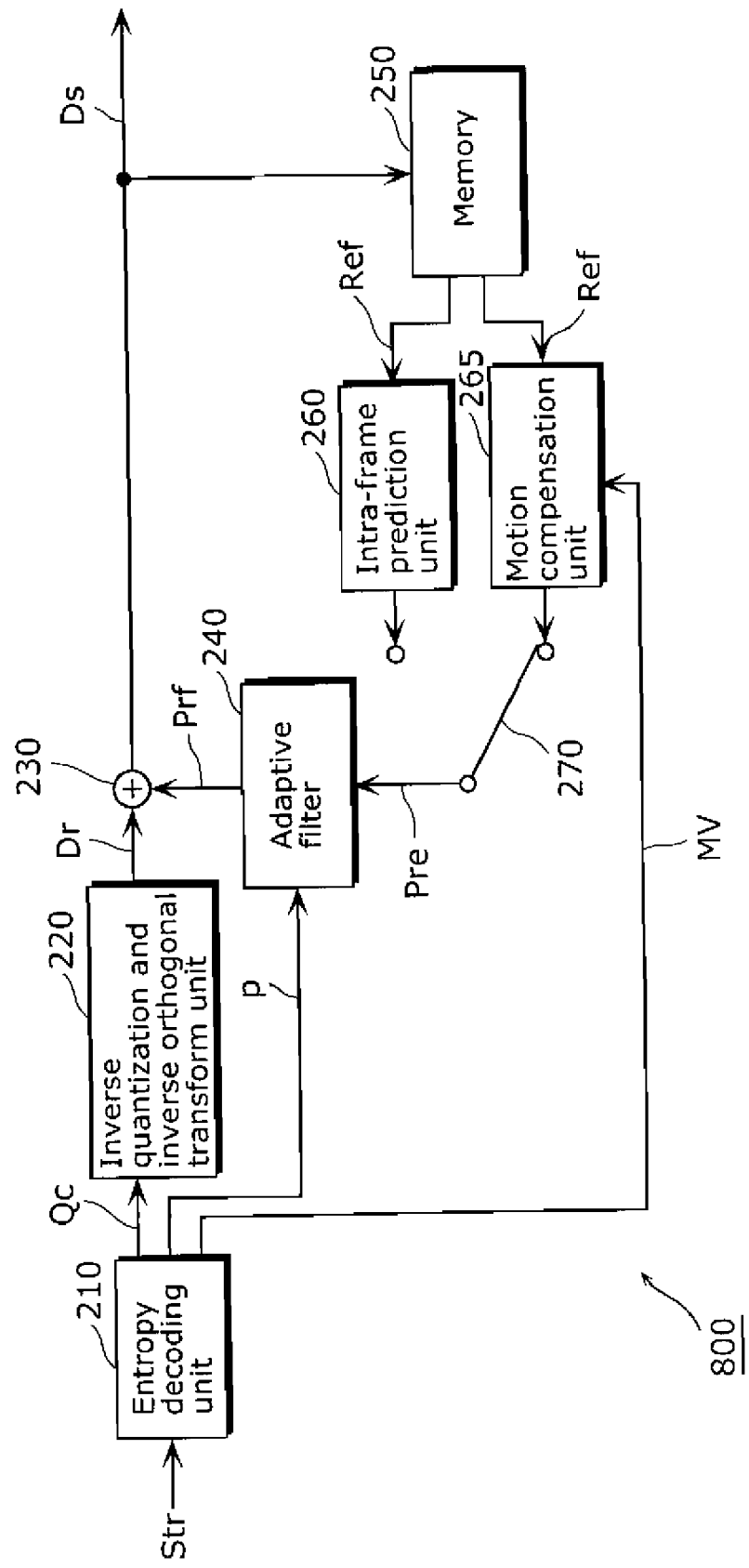
FIG. 16 is a block diagram showing the configuration of an image decoding apparatus according to the third variation of the embodiment of the present invention.

FIG. 16 is a block diagram showing the configuration of the image decoding apparatus according to the present variation.

An adaptive filter 240 of an image decoding apparatus 800 according to the present variation obtains cross-correlation data p extracted by the entropy decoding unit 210 and a predictive image Pre outputted from the intra-frame prediction unit 260 or from the motion compensation unit 265. Then, the adaptive filter 240 computes a filter parameter w used for a Wiener filter, based on the cross-correlation data p, and, using the computed filter parameter w, filters the predictive image Pre with a filter adaptive thereto. As a result, the adaptive filter 240 outputs the filtered predictive image Pre as a filtered predictive image Prf.

The adder 230 handles the filtered predictive image Prf outputted from the adaptive filter 240 in the same manner as with the predictive image Pre, and performs the same processing as that in the above described embodiment.

By doing so, in the present variation, it is possible to improve the image quality of the predictive image Pre (filtered predictive image Prf) to the extent that it is close to the image quality of the corresponding input image, and thus, the data volume of prediction errors Res can be reduced. As a result, the data volume of coded streams Str can be reduced.

(Fourth Variation)

Hereinafter, an image coding apparatus and an image decoding apparatus according to a fourth variation of the above described embodiment of the present invention shall be described.

The image coding apparatus according to the present variation is characterized in that it applies an orthogonal transformation and quantization to input images represented by input image signals In without computing prediction errors Res.

Figure 17:
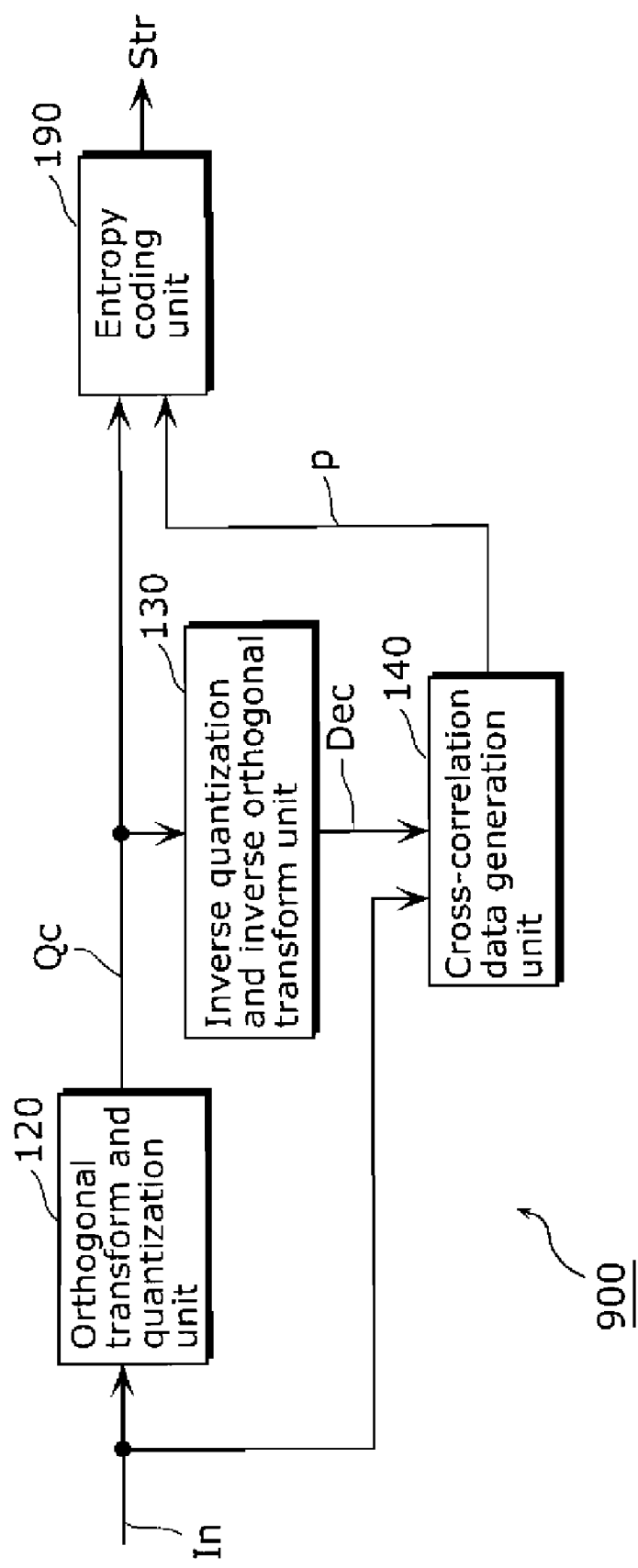
FIG. 17 is a block diagram showing the configuration of an image coding apparatus according to a fourth variation of the embodiment of the present invention.

FIG. 17 is a block diagram showing the configuration of the image coding apparatus according to the present variation.

An image coding apparatus 900 according to the present variation includes an orthogonal transform and quantization unit 120, an inverse quantization and inverse orthogonal transform unit 130, a cross-correlation data generation unit 140, and an entropy coding unit 190.

The transform and quantization unit 120 transforms an input image represented by an input image signal In to frequency components, and quantizes each of the frequency components to compress-code them into quantized coefficients Qc.

The inverse quantization and inverse orthogonal transform unit 130 de-quantizes the quantized coefficients Qc outputted from the orthogonal transform and quantization unit 120 to transform the quantized coefficients Qc to a frequency component. Furthermore, by applying an inverse orthogonal transformation to the frequency component, the inverse quantization and inverse orthogonal transform unit 130 transforms the frequency component to a locally decoded image Dec.

The cross-correlation data generation unit 140 generates cross-correlation data (a cross-correlation vector) p based on an input image represented by an input image signal In and a locally decoded image Dec corresponding to the input image. For example, the cross-correlation data generation unit 140 generates cross-correlation data p for each picture, or for each block or slice which are included in a picture.

The entropy coding unit 190 generates a coded stream Str by performing entropy coding (variable-length coding) on the quantized coefficients Qc generated by the orthogonal transform and quantization unit 120, and on the cross-correlation data p.

Figure 18:
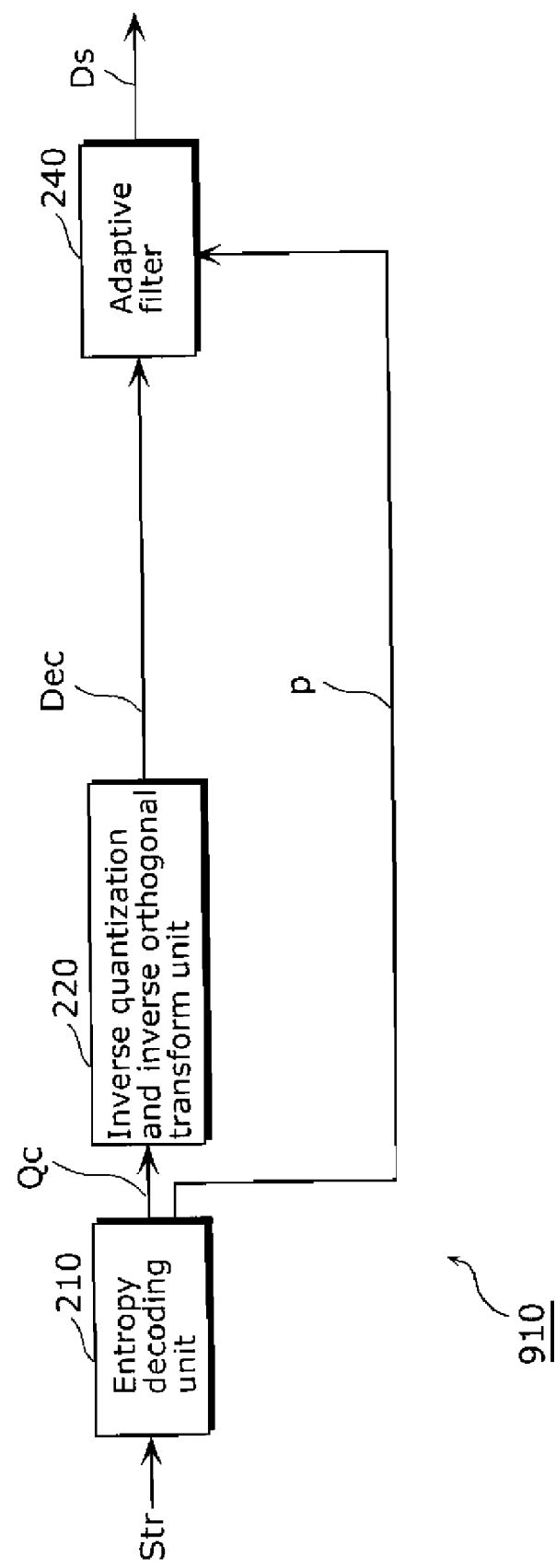
FIG. 18 is a block diagram showing the configuration of an image decoding apparatus according to the fourth variation of the embodiment of the present invention.

FIG. 18 is a block diagram showing the configuration of the image decoding apparatus according to the present variation.

An image decoding apparatus 910 according to the present variation is an apparatus which decodes coded streams Str generated by the image coding apparatus 900 according to the present variation, and includes an entropy decoding unit 210, an inverse quantization and inverse orthogonal transform unit 220, and an adaptive filter 240.

The entropy decoding unit 210 obtains a coded stream Str and performs entropy decoding (variable-length decoding) thereon. Then, the entropy decoding unit 210 extracts quantized coefficients Qc and cross-correlation data p from the entropy decoded coded stream Str.

The inverse quantization and inverse orthogonal transform unit 220 obtains the quantized coefficients Qc extracted by the entropy decoding unit 210, and de-quantizes the quantized coefficients Qc to transform them to frequency components. Furthermore, by applying an inverse orthogonal transformation to the frequency component, the inverse quantization and inverse orthogonal transform unit 220 transforms the frequency component to a decoded image Dec.

The adaptive filter 240 obtains the cross-correlation data p extracted by the entropy decoding unit 210 and the decoded image Dec outputted from the inverse quantization and inverse orthogonal transform unit 220. Then, the adaptive filter 240 computes a filter parameter w used for a Wiener filter, based on the cross-correlation data p, and, using the computed filter parameter w, filters the decoded image Dec with a filter adaptive thereto. As a result, the adaptive filter 240 outputs the filtered decoded image Dec as an output image Ds.

(Fifth Variation)

Hereinafter, an image coding apparatus and an image decoding apparatus according to a fifth variation of the above described embodiment of the present invention shall be described.

The image coding apparatus 100 according to the above described embodiment generates cross-correlation data necessary for computing a filter parameter w used for a Wiener filter, and inserts the generated cross-correlation data p into a coded stream Str. However, such cross-correlation data p may not be inserted into a coded stream Str. More specifically, data other than the above mentioned cross-correlation data p may be inserted into a coded stream Str in the case where an image decoding apparatus computes an appropriate filter parameter that brings a decoded image generated by the image decoding apparatus close to a corresponding input image.

Accordingly, the image coding apparatus according to the present variation generates original data necessary for computing a filter parameter, based on a corresponding input image, and inserts the generated original data into a coded stream Str.

Figure 19:
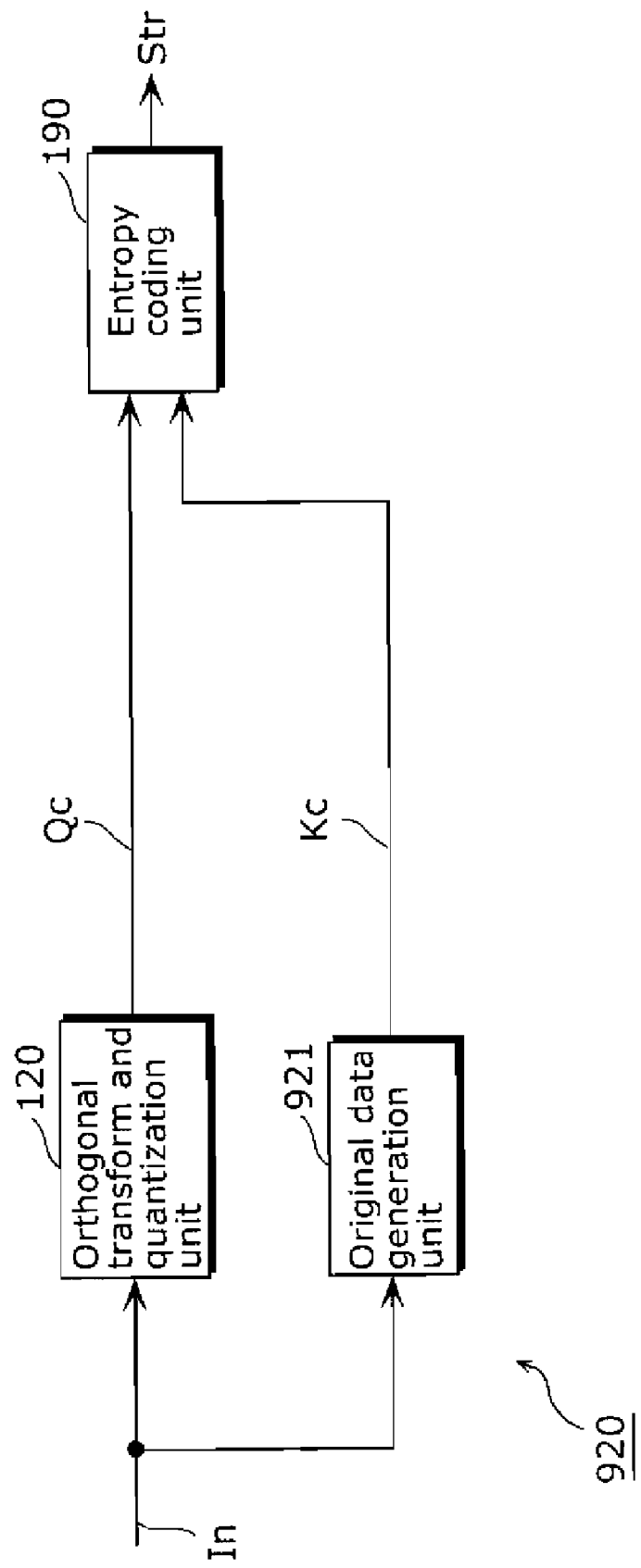
FIG. 19 is a block diagram showing the configuration of an image coding apparatus according to a fifth variation of the embodiment of the present invention.

FIG. 19 is a block diagram showing the configuration of the image coding apparatus according to the present variation.

An image coding apparatus 920 according to the present variation includes an orthogonal transform and quantization unit 120, an original data generation unit 921, and an entropy coding unit 190.

The transform and quantization unit 120 transforms an input image represented by an input image signal In to frequency components, and quantizes each of the frequency components to compress-code them into quantized coefficients Qc.

The original data generation unit 921 generates and outputs the above mentioned original data Kc based on an input image represented by a corresponding input image signal In.

The original data Kc may indicate, for example, the contrast, the brightness or color characteristics of the input image, or a ratio between high frequency components and low frequency components of the input image. Further, the original data Kc may indicate the statistical characteristic, for instance, standard deviation of the pixel values, or indicate whether or not the input image contains sharp details. The original data Kc may indicate a degree or a frequency of changes in the current image data, or indicate when a scene change occurs. Furthermore, the original data Kc may indicate the characteristics of the input image either directly or indirectly using a parameter. In addition, the original data Kc may indicate the genre of the input image, such as sports, news, documentary, music, and so on.

The entropy coding unit 190 generates a coded stream Str by performing entropy coding on the quantized coefficients Qc outputted from the orthogonal transform and quantization unit 120 and the original data Kc outputted from the original data generation unit 921.

Figure 20:
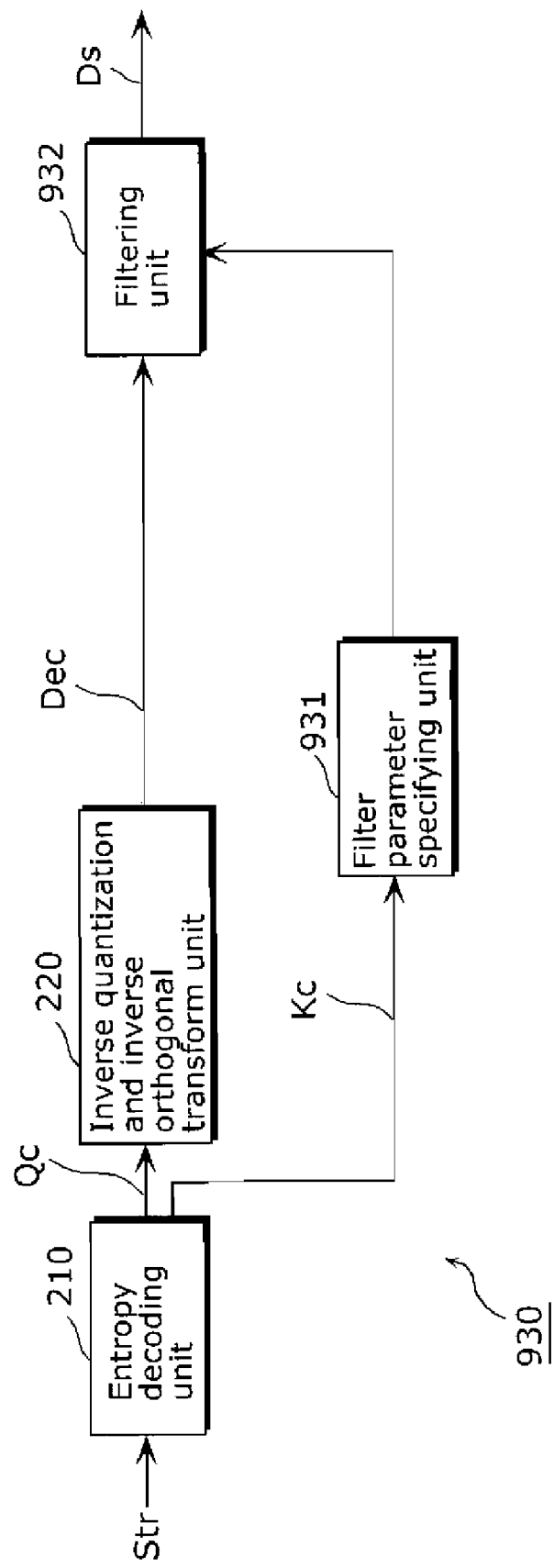
FIG. 20 is a block diagram showing the configuration of an image decoding apparatus according to the fifth variation of the embodiment of the present invention.

FIG. 20 is a block diagram showing the configuration of the image decoding apparatus according to the present variation.

An image decoding apparatus 930 according to the present variation includes an entropy decoding unit 210, an inverse quantization and inverse orthogonal transform unit 220, a filter parameter specifying unit 931, and a filtering unit 932.

The entropy decoding unit 210 obtains a coded stream Str and performs entropy decoding (variable-length decoding) thereon. Then the entropy decoding unit 210 extracts quantized coefficients Qc and original data Kc from the entropy decoded coded stream Str.

The inverse quantization and inverse orthogonal transform unit 220 obtains the quantized coefficients Qc extracted by the entropy decoding unit 210, and de-quantizes the quantized coefficients Qc to transform them to a frequency component. Furthermore, by applying an inverse orthogonal transformation to the frequency component, the inverse quantization and inverse orthogonal transform unit 220 transforms the frequency component to a decoded image Dec.

The filter parameter specifying unit 931 specifies a filter parameter w based on the original data Kc extracted by the entropy decoding unit 210.

For example, the filter parameter specifying unit 931 holds plural filter parameters in advance, and selects a filter parameter adaptive to the contents of the extracted original data Kc.

More specifically, when the original data Kc shows a flat image, the filter parameter specifying unit 931 selects a filter parameter adaptive for smoothing the image, and when the original data Kc indicates an image containing sharp details, it selects a filter parameter adaptive for emphasizing the outlines and so on.

Further, the filter parameter specifying unit 931 may compute a filter parameter based on a numeric value indicated by the original data Kc, such as the contrast, the brightness, color characteristics, or a ratio between high frequency components and low frequency components.

The filtering unit 932 generates an output image Ds by performing a filtering operation on the decoded image Dec according to a filter parameter specified in the above described manner.

(Sixth Variation)

In the above described embodiment, the image coding apparatus 100 inserts cross-correlation data p into a coded stream Str, but it may insert a filter parameter w instead of the cross-correlation data p.

FIG. 21 is a diagram showing an example of syntax for a filter parameter w to be inserted into SEI.

Inserted into SEI as information indicating a filter parameter w are the dimension of the filter parameter w (matrix) (filter_dimension), the number of filter coefficients for each dimension of the filter parameter w (filter_length), the scaling factor of the filter coefficients (scaling_factor), and the filter coefficients (filter_coeffs[color_component][cy] or filter_coeffs[color_component][cy][cx]).

When filter_dimension is 0, it specifies one dimension, and when it is 1, it specifies two dimensions. The length of the filter, that is, the number of filter taps is specified by filter_length. The scaling factor of the filter coefficients is specified by the scaling_factor, and each filter coefficient is divided by the scaling factor. In other words, scaling_factor defines the precision of the filter coefficients. A single filter coefficient is specified by filter_coeffs[color_component] [cy] or filter_coeffs[color_component][cy][cx], and a color component to be filtered is specified by color_component. The cy represents the position (counter) of a filter coefficient in vertical direction in the matrix, and when the matrix is two-dimensional, cx represents the position of a filter coefficient in horizontal direction in the matrix. When filter_dimension specifies two dimensions, the filter coefficients of the filter parameter w are applied as a two-dimensional Finite Impulse Response (FIR) filter, and when filter_dimension specifies one dimension, the filter coefficients of the filter parameter w are applied as a one-dimensional FIR filter in horizontal direction in the first step, and in vertical direction in the next step.

The image coding apparatus and the image decoding apparatus according to the present invention have been described using an embodiment and variations thereof. However, the present invention is not limited to them.

For example, in the above described embodiment and variations, cross-correlation data p is inserted into a coded stream Str. However, such cross-correlation data p may be transmitted separately from a coded stream Str.

Further, each of the functional blocks in the block diagrams (FIGS. 1 to 3, FIG. 8A, FIG. 8B, and FIG. 10 to FIG. 20) is typically embodied as an LSI which is an integrated circuit. Each of them may be in one integrated LSI individually, or in one integrated LSI to include a part or all of them. (For example, functional blocks other than the memory may be in one integrated LSI.)

The name used here is LSI, but it may also be called IC, system LSI, super LSI, or ultra LSI depending on the degree of integration.

Further, ways to achieve integration are not limited to the LSI, and special circuit or general purpose processor and so forth can also achieve the integration. Field Programmable Gate Array (FPGA) that can be programmed after manufacturing LSI or a reconfigurable processor that allows re-configuration of the connection or configuration of circuit cells within LSI may be used for the same purpose.

In the future, with advancement in semiconductor technology or a technology branching therefrom, a brand-new technology may replace LSI. The integration of the functional blocks may be carried out by that technology. Application of biotechnology is one such possibility.

Furthermore, among the functional blocks, the unit for storing data to be coded or decoded may be separately structured without being in one integrated LSI.

Industrial Applicability

The image coding apparatus and image decoding apparatus according to the present invention produce an advantageous effect of reliably preventing deterioration of the image quality of decoded images which have been previously coded, and can be applied to digital video camcorders, mobile phones which handle video, and personal computers, for example.

The invention claimed is:

1. An image decoding apparatus which decodes a coded image, said image decoding apparatus comprising:
    a decoding unit configured to decode the coded image included in a coded stream to generate a decoded image;
    an extraction unit configured to extract cross-correlation data from supplementary enhancement information of a coded picture included in the coded stream, the cross-correlation data indicating a correlation between the decoded image and an image which corresponds to the decoded image and has not yet been coded;
    a parameter computation unit configured to generate auto-correlation data indicating a correlation of the decoded image, and to compute a filter parameter based on the generated auto-correlation data and the cross-correlation data extracted by said extraction unit; and
    a filtering unit configured to perform a filtering operation on the decoded image according to the filter parameter.

2. The image decoding apparatus according to claim 1,
    wherein said parameter computation unit is configured to compute the filter parameter as a filter coefficient used for a Wiener filter.

3. The image decoding apparatus according to claim 2,
    wherein said filtering unit is configured to output the decoded image, on which the filtering operation has been performed, as a filtered decoded image, and
    said decoding unit is configured to decode, using the filtered decoded image, a following coded image which follows the coded image.

4. The image decoding apparatus according to claim 3 further comprising:
    a storage unit having a region for storing a reference image; and
    a prediction unit configured to generate a predictive image corresponding to the following coded image which follows the coded image by selecting, from reference images stored in said storage unit, a reference image corresponding to the following coded image,
    wherein said filtering unit is configured to store the filtered decoded image in said storage unit as the reference image, and
    said decoding unit is configured to decode the following coded image by adding the following coded image and the predictive image.

5. The image decoding apparatus according to claim 3 further comprising:
    a storage unit having a region for storing a reference image; and
    a prediction unit configured to generate a predictive image corresponding to the following coded image which follows the coded image by selecting, from reference images stored in said storage unit, a reference image corresponding to the following coded image,
    wherein said filtering unit is configured to generate the filtered decoded image by performing the filtering operation on the predictive image according to the filter parameter, and
    said decoding unit is configured to store the generated decoded image in said storage unit as the reference image, and to decode the following coded image by adding the following coded image and the filtered decoded image.

6. The image decoding apparatus according to claim 1, wherein said parameter computation unit is configured to generate the auto-correlation data for each of areas of the decoded image, and to compute the filter parameter for each of the areas.

7. The image decoding apparatus according to claim 6, wherein said parameter computation unit is configured to treat, as each of the areas, a block, a slice, a picture, or a set of plural pictures, and to compute the auto-correlation data and the filter parameter for each of the areas.

8. The image decoding apparatus according to claim 1, wherein said extraction unit is configured to extract the cross-correlation data from a header of an area which includes a coded block, a coded slice, a coded picture, or a set of plural coded pictures, the header being included in the coded stream.

9. An image decoding method for decoding a coded image, said image decoding method comprising:

decoding the coded image included in a coded stream to generate a decoded image;

extracting cross-correlation data from supplementary enhancement information of a coded picture included in the coded stream, the cross-correlation data indicating a correlation between the decoded image and an image which corresponds to the decoded image and has not yet been coded;

generating auto-correlation data indicating a correlation of the decoded image, and computing a filter parameter based on the generated auto-correlation data and the cross-correlation data extracted in said extracting; and performing a filtering operation on the decoded image according to the filter parameter.

10. A non-transitory computer-readable medium having a program stored thereon for decoding a coded image, said program causing a computer to execute:

decoding the coded image included in a coded stream to generate a decoded image;

extracting cross-correlation data from supplementary enhancement information of a coded picture included in the coded stream, the cross-correlation data indicating a correlation between the decoded image and an image which corresponds to the decoded image and has not yet been coded;

generating auto-correlation data indicating a correlation of the decoded image, and computing a filter parameter based on the generated auto-correlation data and the cross-correlation data extracted in the extracting; and performing a filtering operation on the decoded image according to the filter parameter.

11. An integrated circuit which decodes a coded image, said integrated circuit comprising:

a decoding unit configured to decode the coded image included in a coded stream to generate a decoded image;

an extraction unit configured to extract cross-correlation data from supplementary enhancement information of a coded picture included in the coded stream, the cross-correlation data indicating a correlation between the decoded image and an image which corresponds to the decoded image and has not yet been coded;

a parameter computation unit configured to generate auto-correlation data indicating a correlation of the decoded image, and to compute a filter parameter based on the generated auto-correlation data and the cross-correlation data extracted by said extraction unit; and a filtering unit configured to perform a filtering operation on the decoded image according to the filter parameter.

* * * * *